(12) United States Patent
Yang et al.

(10) Patent No.: US 10,459,805 B2
(45) Date of Patent: Oct. 29, 2019

(54) METHOD AND SYSTEM FOR DATA RECOVERY IN A DATA SYSTEM

(71) Applicant: Yahoo Holdings, Inc., Sunnyvale, CA (US)

(72) Inventors: Guangxin Yang, Beijing (CN); Dongyue Wang, Beijing (CN); Sihan Ge, Beijing (CN); Xinyu Wang, Beijing (CN); Wei Liang, Beijing (CN)

(73) Assignee: Oath Inc., New York, NY (US)

( * ) Notice: Subject to any disclaimer, the term of this patent is extended or adjusted under 35 U.S.C. 154(b) by 644 days.

(21) Appl. No.: 14/437,300

(22) PCT Filed: Apr. 3, 2015

(86) PCT No.: PCT/CN2015/075842
§ 371 (c)(1),
(2) Date: Apr. 21, 2015

(87) PCT Pub. No.: WO2016/155002
PCT Pub. Date: Oct. 6, 2016

(65) Prior Publication Data
US 2017/0046234 A1    Feb. 16, 2017

(51) Int. Cl.
*G06F 16/00* (2019.01)
*G06F 11/14* (2006.01)
*G06F 16/23* (2019.01)

(52) U.S. Cl.
CPC ...... *G06F 11/1474* (2013.01); *G06F 11/1464* (2013.01); *G06F 16/2365* (2019.01); *G06F 2201/84* (2013.01)

(58) Field of Classification Search
None
See application file for complete search history.

(56) References Cited

U.S. PATENT DOCUMENTS 6,012,094 A * 1/2000 Leymann ............... G06F 9/466
                                                    707/999.202
8,060,534 B1 * 11/2011 Ansari .............. H04L 29/12264
                                                    707/794

(Continued)

FOREIGN PATENT DOCUMENTS

CN    103942252 A    7/2014
WO    2004100020 A2  11/2004

OTHER PUBLICATIONS

International Search Report and Written Opinion dated Jan. 11, 2016 in International Application PCT/CN2015/075842.

(Continued)

*Primary Examiner* — Bai D Vu
(74) *Attorney, Agent, or Firm* — Pillsbury Winthrop Shaw Pittman LLP

(57) ABSTRACT

The present teaching relates to managing a request in a data system of a plurality of nodes in a network. In one example, a request is received for a transaction of data by a first node in the data system. A second node in the data system is determined based on the request, where the second node is to carry out the transaction. The request is stored into a first request queue at the first node. The request is sent to the second node. A notice is obtained by the first node indicating that information associated with the transaction has been persistently stored. The request is removed from the first request queue in response to the notice being obtained.

17 Claims, 16 Drawing Sheets

(56) References Cited

U.S. PATENT DOCUMENTS

| | | | |
|---|---|---|---|
| 8,533,169 B1* | 9/2013 | Bailey | G06F 17/30309 |
| | | | 707/610 |
| 8,880,480 B2 | 11/2014 | Kundu et al. | |
| 8,965,849 B1 | 2/2015 | Goo | |
| 9,170,928 B1* | 10/2015 | Dantkale | G06F 12/0223 |
| 2003/0009623 A1* | 1/2003 | Arimilli | G06F 12/0813 |
| | | | 711/119 |
| 2015/0261626 A1 | 9/2015 | Wen et al. | |

OTHER PUBLICATIONS

International Preliminary Report on Patentability dated Oct. 12, 2017 in International Application PCT/CN2015/075842.

* cited by examiner

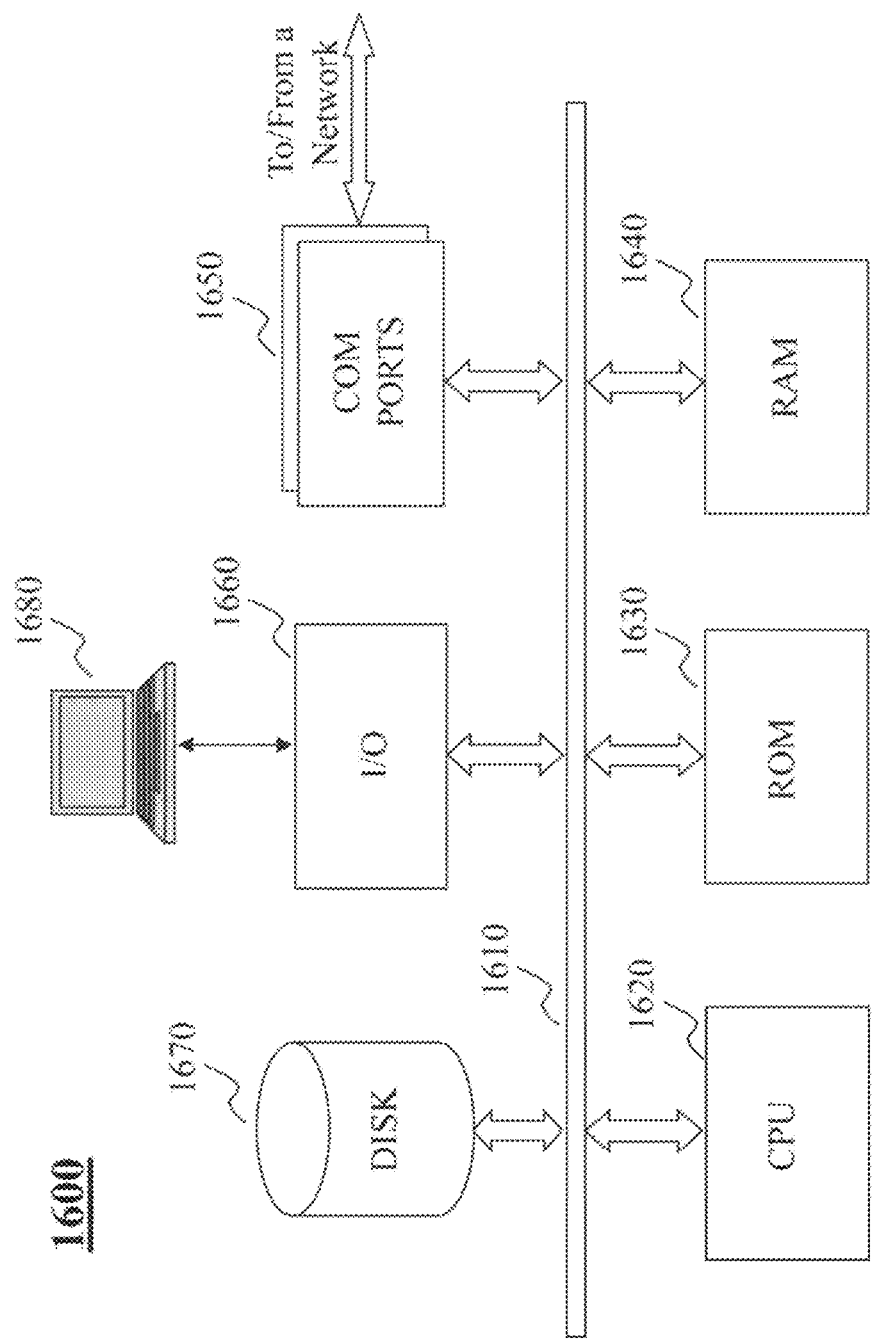

METHOD AND SYSTEM FOR DATA RECOVERY IN A DATA SYSTEM

CROSS REFERENCE TO RELATED APPLICATION

This application is a national stage application, filed under 35 U.S.C. § 371, of International Application No. PCT/CN2015/075842, filed on Apr. 3, 2015, entitled "METHOD AND SYSTEM FOR DATA RECOVERY IN A DATA SYSTEM", which is hereby incorporated by reference in its entirety.

BACKGROUND

1. Technical Field

The present teaching relates to methods, systems, and programming for data processing. Particularly, the present teaching is directed to methods, systems, and programming for data recovery in a data system.

2. Discussion of Technical Background

The advancement in the Internet has made it possible to make a tremendous amount of information accessible to users located anywhere in the world. This introduces new challenges in data processing for "big data," where a data set can be so large or complex that traditional data processing applications are inadequate. Distributed in-memory systems can offer high throughput and low latency, but may often suffer from complete data loss in case of node failures.

A conventional approach is to synchronously or asynchronously replicate data from a given node to multiple (k) other nodes through a two phase commit (2PC) protocol, for data recovery in case of data failure at the given node. This 2PC protocol needs server rounds of network communication that slows down the whole system. In addition, as each record is replicated for multiple (k) copies, system resources like storage space are severely underutilized at 1/k. This low utilization rate is especially problematic for in-memory systems when memory chips are still expensive.

Therefore, there is a need to develop techniques to recover data in a data system to overcome the above drawbacks.

SUMMARY

The present teaching relates to methods, systems, and programming for data processing. Particularly, the present teaching is directed to methods, systems, and programming for data recovery in a data system.

In one example, a method, implemented on a machine having at least one processor, storage, and a communication platform connected to a network for managing a request in a data system comprising a plurality of nodes is disclosed. A request is received for a transaction of data by a first node in the data system. A second node in the data system is determined based on the request. The second node is to carry out the transaction. The request is stored into a first request queue at the first node. The request is sent to the second node. A notice is obtained indicating that information associated with the transaction has been persistently stored. The request is removed from the first request queue in response to the notice.

In a different example, a method, implemented on a machine having at least one processor, storage, and a communication platform connected to a network for data recovery at a first node in a data system comprising a plurality of nodes and a persistent storage, is disclosed. A failure in connection with first data is detected at the first node. Information is obtained from the persistent storage. The information is associated with a most recent transaction related to the first node. Each of the other nodes in the data system is requested to transmit one or more transaction requests previously sent to the first node after the most recent transaction. The one or more transaction requests are received from at least one of the other nodes. A sequence of one or more transactions associated with the one or more transaction requests is determined. The one or more transactions are executed according to the sequence in order to recover the first data at the first node.

In another example, a system having at least one processor, storage, and a communication platform connected to a network for managing a request in a data system comprising a plurality of nodes, is disclosed. The system comprises a request analyzer, a coordinate site determiner, a transaction forwarding unit, a transaction obtaining controller, and a request queue clearing unit. The request analyzer is located in a first node in the data system and configured for receiving a request for a transaction of data. The coordinate site determiner is located in the first node and configured for determining a second node in the data system based on the request and storing the request into a first request queue at the first node. The second node is to carry out the transaction. The transaction forwarding unit is located in the first node and configured for sending the request to the second node. The transaction obtaining controller is located in the first node and configured for obtaining a notice indicating that information associated with the transaction has been persistently stored. The request queue clearing unit is located in the first node and configured for removing the request from the first request queue in response to the notice.

In yet another example, a system having at least one processor, storage, and a communication platform connected to a network for data recovery at a first node in a data system comprising a plurality of nodes and a persistent storage, is disclosed. The system comprises a recovery initiator, a commit log retrieving unit, a buffered request demander, a buffered request receiver, a transaction sequence determiner, and one or more partition execution engines. The recovery initiator is located in the first node and configured for detecting a failure in connection with first data. The commit log retrieving unit is located in the first node and configured for obtaining information associated with a most recent transaction related to the first node from the persistent storage. The buffered request demander is located in the first node and configured for requesting each of the other nodes in the data system to transmit one or more transaction requests previously sent to the first node after the most recent transaction. The buffered request receiver is located in the first node and configured for receiving, from at least one of the other nodes, the one or more transaction requests. The transaction sequence determiner is located in the first node and configured for determining a sequence of one or more transactions associated with the one or more transaction requests. The one or more partition execution engines are located in the first node and configured for executing the one or more transactions according to the sequence in order to recover the first data at the first node.

Other concepts relate to software for implementing the present teaching on data recovery. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for managing a request in a data system comprising a plurality of nodes is disclosed. The information, when read by the machine, causes the machine to perform the following. A request is received for a transaction of data by a first node in the data system. A second node in the data system is determined based on the request. The second node is to carry out the transaction. The request is stored into a first request queue at the first node. The request is sent to the second node. A notice is obtained indicating that information associated with the transaction has been persistently stored. The request is removed from the first request queue in response to the notice.

In a different example, a machine-readable, non-transitory and tangible medium having information recorded thereon for data recovery at a first node in a data system comprising a plurality of nodes and a persistent storage is disclosed. The information, when read by the machine, causes the machine to perform the following. A failure in connection with first data is detected at the first node. Information is obtained from the persistent storage. The information is associated with a most recent transaction related to the first node. Each of the other nodes in the data system is requested to transmit one or more transaction requests previously sent to the first node after the most recent transaction. The one or more transaction requests are received from at least one of the other nodes. A sequence of one or more transactions associated with the one or more transaction requests is determined. The one or more transactions are executed according to the sequence in order to recover the first data at the first node.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 16 depicts the architecture of a computer which can be used to implement a specialized system incorporating the present teaching.

DETAILED DESCRIPTION

Figure 1:
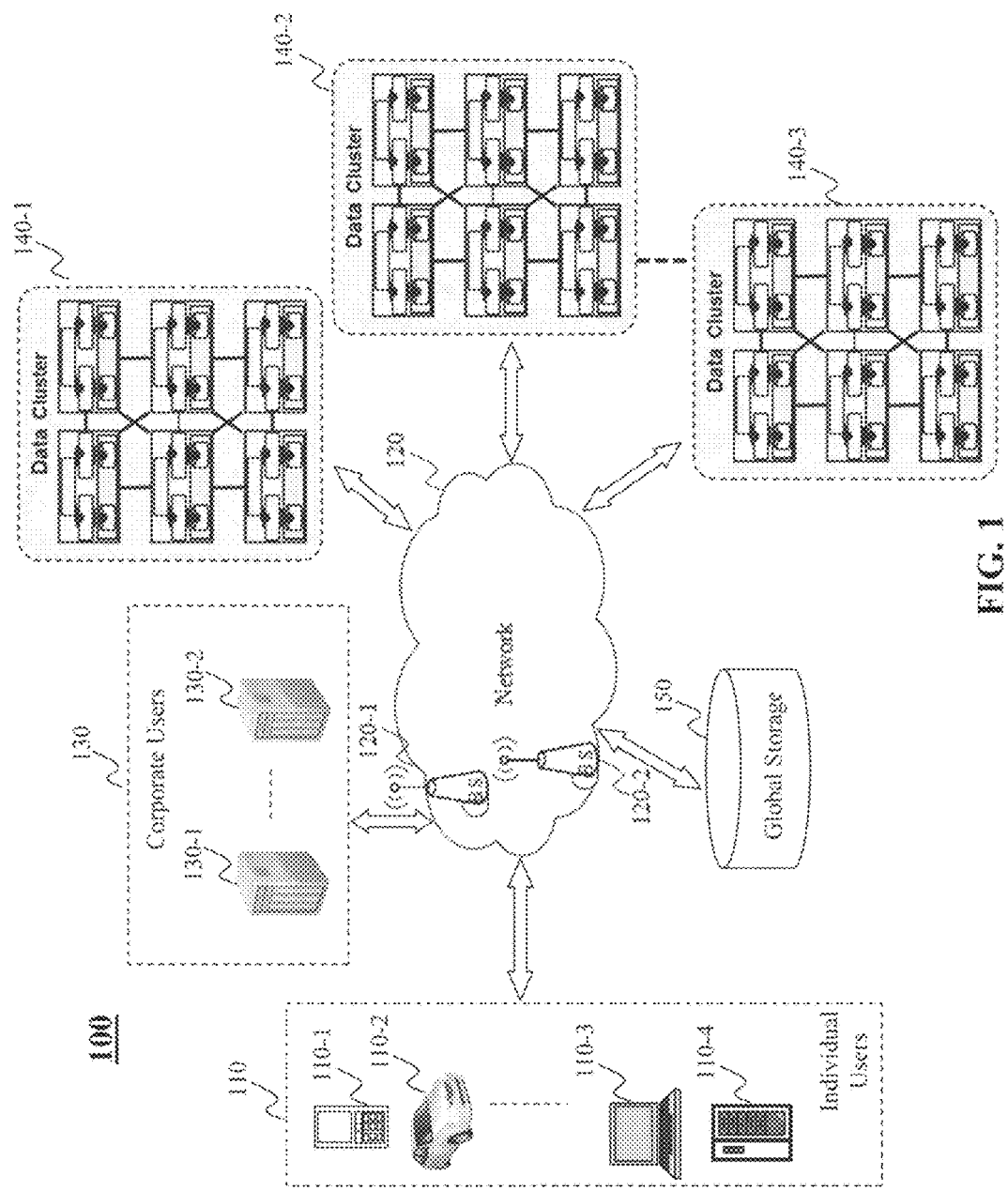
FIG. 1 is a high level depiction of an exemplary networked environment for managing data recovery in a data system, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of data recovery in a data system, realized as a specialized and networked system by utilizing one or more computing devices (e.g., mobile phone, personal computer, etc.) and network communications (wired or wireless). The method and system as disclosed herein aim at recover data in a data system in an effective and efficient manner.

A data system may include a plurality of data clusters, each of which can include one or more network nodes. Distributed in-memory data systems, such as an in-memory Massively Parallel Processing (MPP) Structured Query Language (SQL) Engine or a key-value store, may offer high throughput and low latency. However, they often suffer from complete data loss in case of node failures. Data replication solves durability problem at the cost of severely reducing resource utilization rate and hurting system performance due to the high cost of executing distributed transactions with a two phase commit (2PC) protocol.

The method and system disclosed in the present teaching can make novel usage of multiple copies of a transaction definition naturally created during its execution. As a data system executes a transaction, the transaction definition is often transmitted among different nodes, leading to replicated copies of the transaction definition on multiple nodes. With careful coordination, these replicated copies can be used to recover failed nodes.

A transaction may be expressed as a series of SQL or HiveQL statements, each of which can be represented as query plans. In the present teaching, the terms "transaction," "transaction definition," "transaction request," and "request" will be used interchangeably.

A distributed in-memory system comprises multiple sites, each of which can have multiple partitions. In one embodiment, a site may be a network node. In another embodiment, a site may be located on multiple nodes. Without loss of generality, "site" and "node" will be used interchangeably in the present teaching.

Any site can receive client requests in form of transactions, which can be assigned a global order as its transaction identity (ID) and may be forwarded to an appropriate site for execution. The site receiving the request is referred as a receiving site (RS), while the site coordinating for execution is referred as a coordination site (CS). In this manner, at least two copies of the transaction definition exist in the data system, one on the receiving site and the other on the coordination site. For a transaction whose receiving site happens to be its coordination site, the transaction may be replicated to another site. Usually, a receiving site discards the requests after the forward finishes. In the present teaching, requests at a receiving site are kept in memory and not discarded until it is safe to do so.

With these multiple copies and careful snapshotting strategies, any failed node can be recovered to its correct state or replaced by a new node. For example, after a node detects a data failure, it can restore to a memory state based on its latest snapshot and/or a log. Then, the node may ask other nodes that have sent the node requests to send those requests again, as those requests are kept on the other nodes, e.g. in a queue. This can solve the data recovery issue without reducing resource utilization rate or hurting system performance, and thus avoid all drawbacks of the 2PC protocol.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for managing data recovery in a data system, according to an embodiment of the present teaching. In FIG. 1, the exemplary networked environment 100 includes corporate users 130, individual users 110, a network 120, data clusters 140, and a global storage 150. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 120 may be an online advertising network or ad network that is a company connecting advertisers to web sites that want to host advertisements. The network 120 may also include various network access points, e.g., wired or wireless access points such as base stations or Internet exchange points 120-1 . . . 120-2, through which a data source may connect to the network 120 in order to transmit information via the network 120.

Individual users 110 may be of different types such as users connected to the network 120 via desktop computers 110-1, laptop computers 110-2, a built-in device in a motor vehicle 110-3, or a mobile device 110-4. An individual user 110 may send a request to one of the data clusters 140 via the network 120 for data processing. The data processing may be related to a transaction associated with one or more nodes in the data cluster. Each node may include one or more partitions. Each partition can be affiliated with a CPU core, which schedules by a scheduler and executes by an execution engine, single-partition transactions or part of a multiple-partition transaction serially. A node receiving a transaction request may determine whether to execute the transaction or forward the request to another node in the cluster for execution. More often than not, the node receiving the request is different from the node executing the transaction. After forwarding the request to the executing node, the receiving node still keeps the copy of the request. In case the executing node has a data failure related to the transaction, the receiving node can send again the copy of the request for the executing node to recover data.

More often than not, a corporate user 130-1 can send a request to the data clusters 140 via the network 120 for data processing. The corporate user 130-1 may represent a company, a corporation, a group of users, an entity, etc. For example, a company that is an Internet service provider may want to retrieve or record data related to online activities of users of the Internet service provided by the company. In that case, the data may be stored in the data clusters 140 as various types, e.g. in databases like Hive, HBase, HDFS, etc. This may be because users' online activities can include different types of actions and hence be related to different and heterogeneous types of data.

The data clusters 140 form a data system but connect to the network 120 via different gateways. Any of the data clusters 140-1, 140-2, 140-3 can receive a transaction request, from either a corporate user 130 or an individual user 110. In one embodiment, the request may be received randomly by a node in the cluster. Based on the request, the node receiving the request can determine a destination node or executing node and forward the request to the destination node for executing the requested transaction. The receiving node may keep a copy of the request in case the destination node needs it to recover data. If the receiving node happens to be the destination node for the transaction request, the receiving node may send an extra copy of the request to another node in the cluster. If there are N nodes or sites in a cluster and if a request arrives randomly, the probability that a transaction's receiving node equals its destination node is 1/N. When N is large, the probability for the special replication procedure is low and negligible.

The global storage 150 in this example is a reliable and persistent file system, e.g. HDFS. The global storage 150 can store data persistently such that the data will not disappear after power off like in memory storage. The global storage 150 can be accessed by any node in the data clusters 140.

In one embodiment, a node in a data cluster 140-1 can take a snapshot of its memory state periodically and store the snapshot into the global storage 150. Accordingly, the node can notify its receiving nodes to clear the requests forwarded to the node and executed before the snapshot. In another embodiment, the node may log a committed transaction after execution of the transaction and store the commit log persistently into the global storage 150. Accordingly, the node can notify its receiving nodes to clear the requests forwarded to the node and executed before the commit log. For example, the snapshot may be taken and persistently stored every day and the commit log may be performed and persistently stored every hour. In that case, if a node detects a data failure or loses all data on the node, it may first restore its latest snapshot from the global storage 150. This can help the node to recover to its memory state of at least the previous day. Then, the node may load its commit logs stored in the global storage 150 after the latest snapshot, and re-execute the transactions in the commit logs. This can help the node to recover to its memory state when the latest commit log was stored. Data change at the node after the latest commit log may not be tracked from the global storage 150, but can be recovered with help of other nodes. The node's corresponding receiving nodes after the latest commit log may still keep a copy of the requests forwarded to the node after the latest commit log. Therefore, the node can ask the receiving nodes to forward again the transaction requests after the latest commit log, and re-execute the transactions to fully recover its memory state to the data failing point. In one embodiment, the re-execution of the transactions according to the commit log or the resent requests should be in the same order as the original execution of the transactions to ensure correct data recovery.

Figure 2:
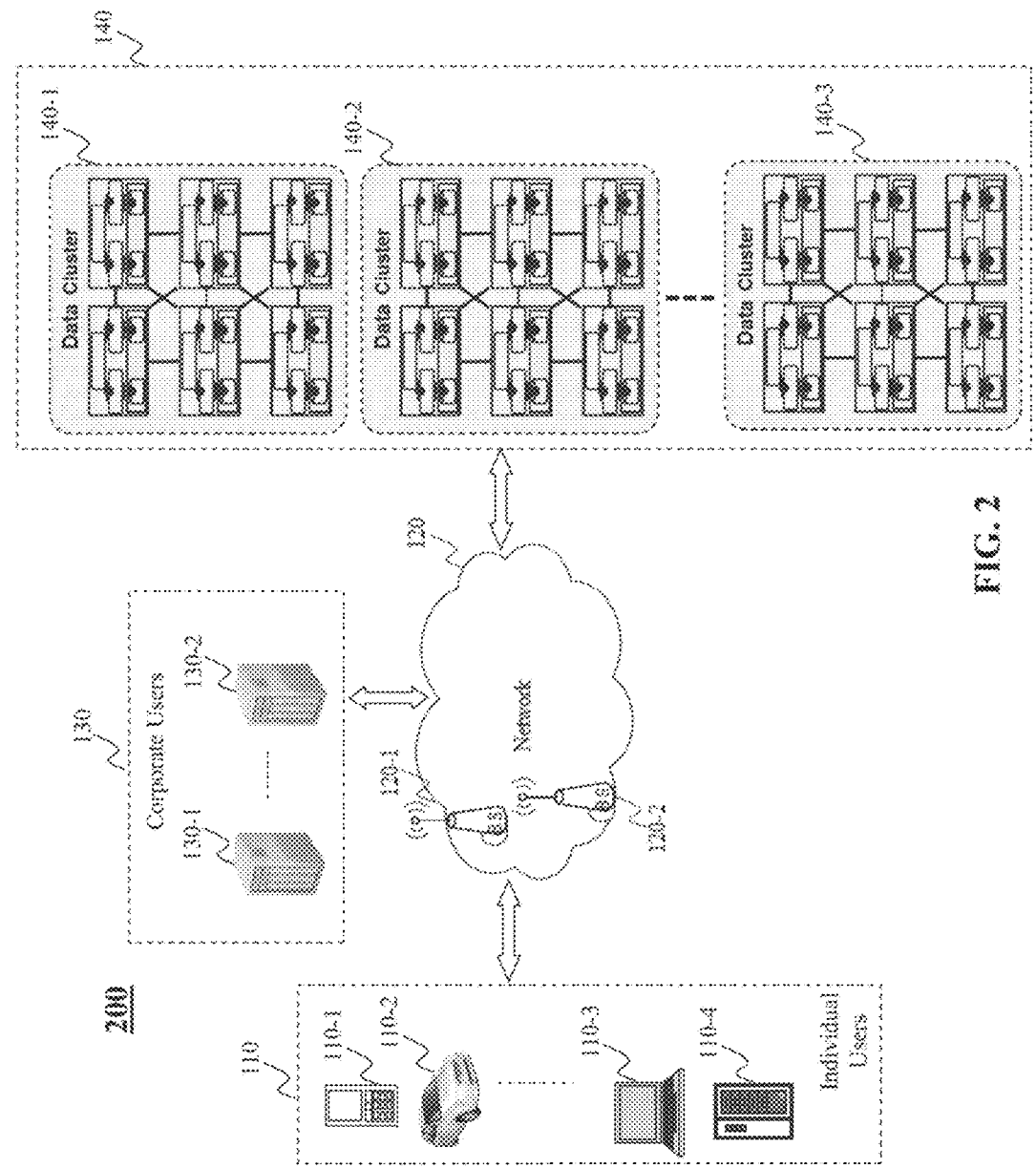
FIG. 2 is a high level depiction of another exemplary networked environment for managing data recovery in a data system, according to an embodiment of the present teaching.

FIG. 2 is a high level depiction of another exemplary networked environment 200 for data recovery in a data system, according to an embodiment of the present teaching. The exemplary networked environment 200 in this embodiment is similar to the exemplary networked environment 100 in FIG. 1, except that the data clusters 140 connect to each other with a local network, and connect to the network 120 e.g. via a global gateway. In addition, the exemplary networked environment 200 does not include a global storage. But each node in the data clusters 140 in this example may include a local disk that is a persistent storage and has a function similar to the global storage 150 in FIG. 1 for data recovery at the node.

Figure 3:
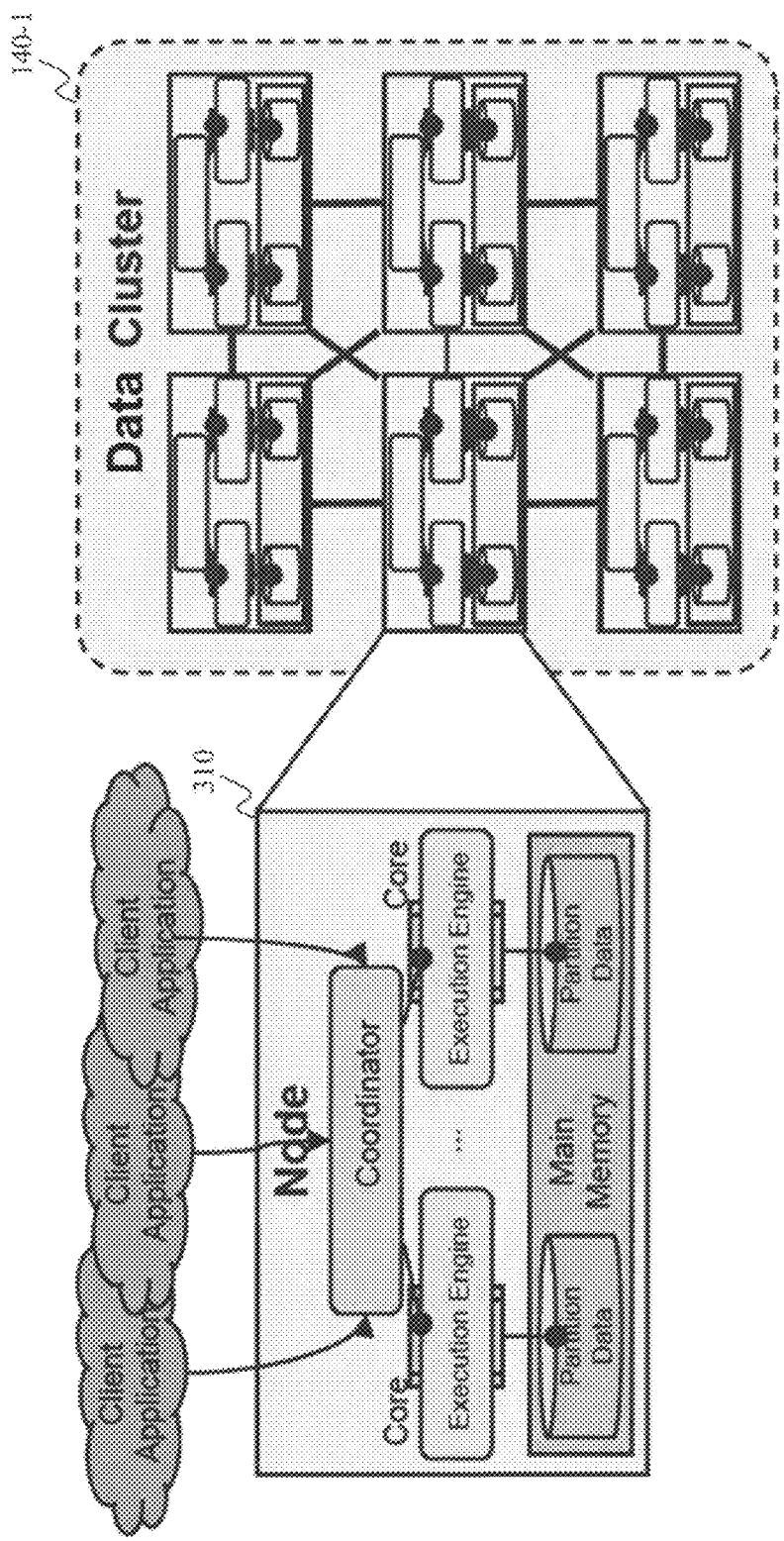
FIG. 3 illustrates a structure of a node in a data cluster, according to an embodiment of the present teaching.

FIG. 3 illustrates a structure of a node 310 in a data cluster 140-1, according to an embodiment of the present teaching. As illustrated in FIG. 3, the data cluster 140-1 includes a plurality of nodes connected to each other. Each node, e.g. the node 310, may include multiple partitions: partition 1 . . . partition N. Each partition may be associated with part of data in a main memory of the node, such that different partitions are associated with different parts of the data in the main memory. Each partition can be associated with a CPU core configured as an execution engine to execute transactions with respect to the partition data associated with the partition.

The node 310 may also include a coordinator configured for coordinating different partitions in the node 310. The coordinator may communicate with users, e.g. through client applications on the users.

A distributed in-memory engine may be implemented on one or more of the data clusters 140. The distributed in-memory engine may include a plurality of sites, each of which may be maintained by a node in the data clusters 140.

Figure 4:
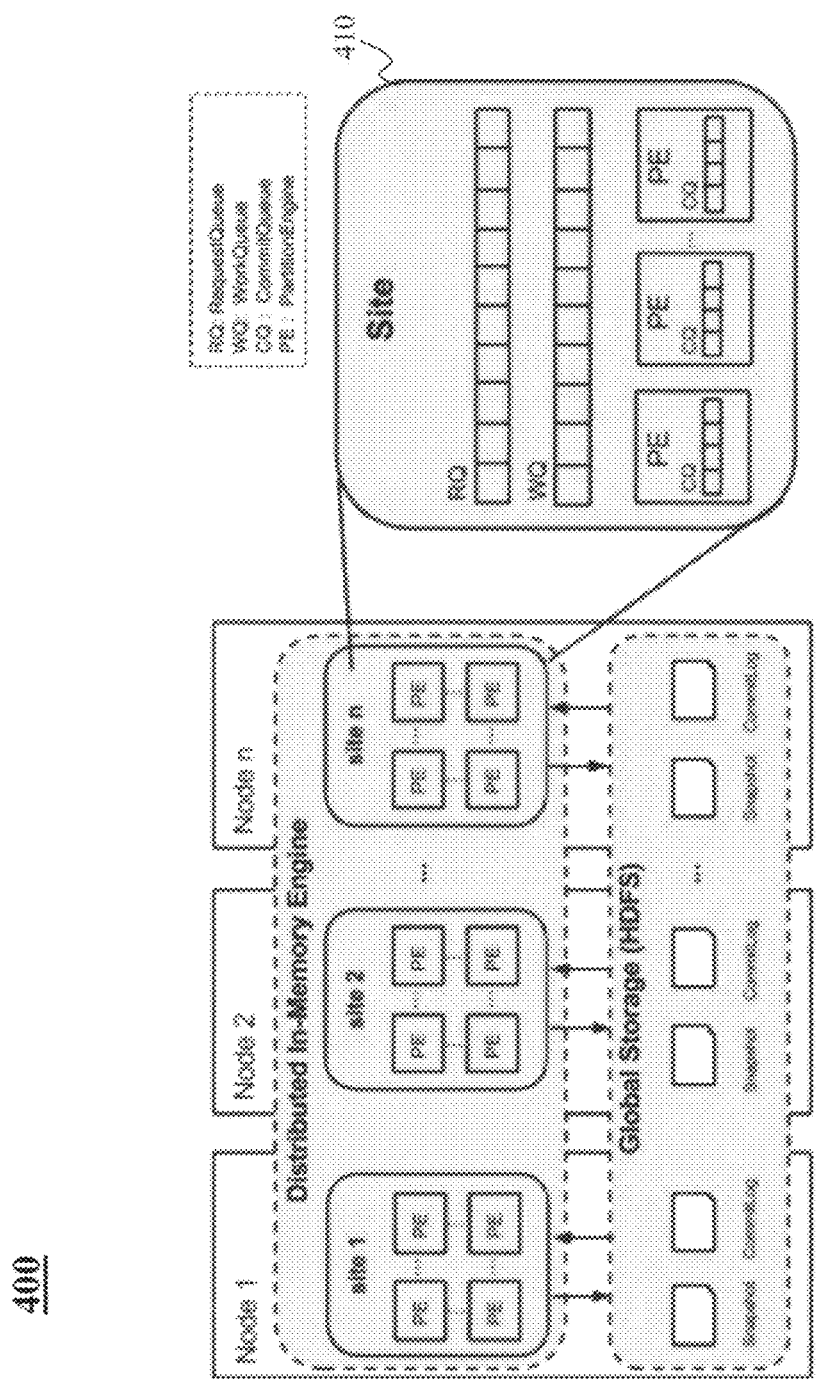
FIG. 4 illustrates an exemplary system configuration of a distributed in-memory engine, according to an embodiment of the present teaching.

FIG. 4 illustrates an exemplary system configuration of a distributed in-memory engine 400, according to an embodiment of the present teaching. In this example, each site in the distributed in-memory engine 400 maintains a Request Queue (RQ) where received transactions are kept and a Work Queue (WQ) that keeps transactions whose executions should be coordinated by this site. A site buffers a transaction in its request queue and decides which site in the cluster should be the coordination site. A site's memory can be divided into multiple partitions. To avoid complex concurrency control that hurts system performance, an in-memory system often has a dedicated thread to execute transactions on a certain partition. This execution thread can be referred as a Partition Engine (PE), which maintains a queue of committed transactions. A transaction may need to access only a single partition's data and hence be referred as a Single Partition (SP) transaction. In some cases, a transaction may need to access data on multiple partitions and hence be referred as a Multiple Partition (MP) transaction.

A site, e.g. the site 410, may be a receiving site for a transaction, when the site receives a request associated with the transaction from a user. The site 410 may also be a coordination site for a transaction, when the site coordinates execution of the transaction. As discussed before, a receiving site receiving a request about a transaction can determine the coordination site for the transaction and forward the transaction to the coordination site for execution. The receiving site may keep a copy of the request after the forwarding, e.g. in its request queue. After the coordination site executes the transaction and persistently stores the commit log, the coordination site can notify its receiving site to clear the request from its request queue, because the coordination site can recover data from the commit log and thus does not need an extra copy of the request saved at the receiving site. The space in the distributed in-memory engine 400 can thus be utilized efficiently and effectively.

In one case, the site 410 may be both the receiving site and the coordination site for a transaction. Then, the site 410 can perform a special replication procedure to replicate the transaction to another site in the distributed in-memory engine 400 for potential data recovery. If there are N sites in the distributed in-memory engine 400 and a request arrives randomly on a node, the chance that a transaction's receiving site equals its coordination site is 1/N. When N is large, the probability for the special replication procedure is low and negligible.

Figure 5:
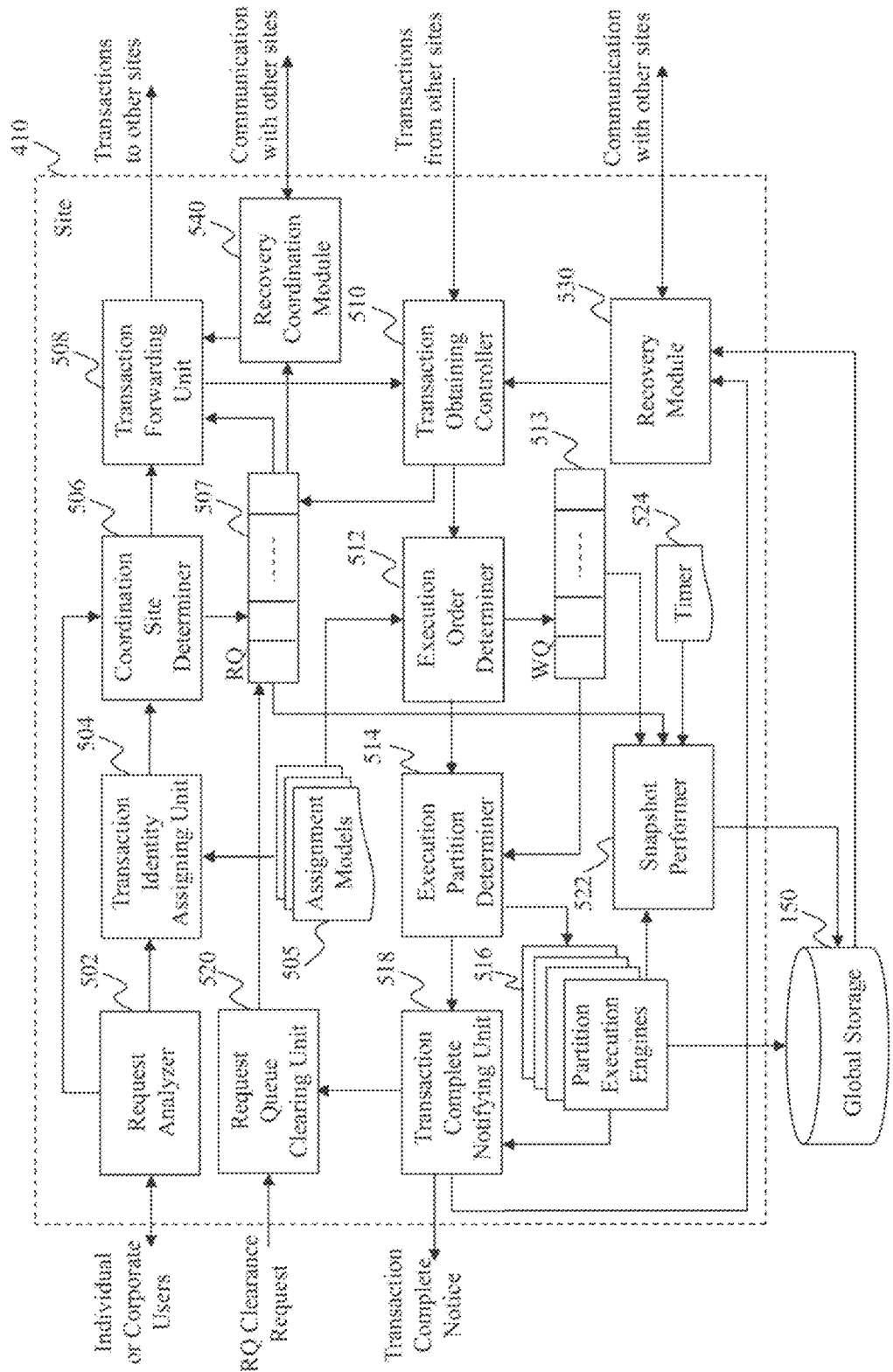
FIG. 5 illustrates an exemplary diagram of a site, according to an embodiment of the present teaching.

FIG. 5 illustrates an exemplary diagram of a site 410, according to an embodiment of the present teaching. The site 410 in this example includes a request analyzer 502, a transaction identity assigning unit 504, one or more assignment models 505, a coordination site determiner 506, a request queue (RQ) 507, a transaction forwarding unit 508, a transaction obtaining controller 510, an execution order determiner 512, a work queue (WQ) 513, an execution partition determiner 514, one or more partition execution engines 516, a transaction complete notifying unit 518, a request queue clearing unit 520, a snapshot performer 522, a timer 524, a recovery module 530, and a recovery coordination module 540.

The request analyzer 502 in this example can receive and analyze a transaction request from a user, which may be an individual user or a corporate user. As discussed above, the transaction request may arrive randomly at the site 410. Therefore, it is likely that the request is directed to another site for execution. The request may be directed to another site in the same cluster as the site 410 or even directed to another site in another cluster. The request analyzer 502 may send information about the request to the transaction identity assigning unit 504 for assigning a transaction identity (ID). The request analyzer 502 may also send information about the request to the coordination site determiner 506 for determining a coordination site to which the request is directed.

The transaction identity assigning unit 504 in this example can assign a transaction ID to the request based on one of the assignment models 505. An assignment model can define how to assign a transaction ID to a transaction. For example, according to one assignment model, a transaction ID may include information about time of arrival, transaction type, priority, receiving site and/or coordination site, etc. The transaction identity assigning unit 504 may select an assignment model based on data recovery rate in a previous time period and utilize the assignment model to assign a transaction ID to the transaction. In one embodiment, the same assignment model is used by all sites in the same cluster, for data recovery in the cluster.

A transaction ID for a transaction assigned at a site may be a global ID in the cluster including the site. That is, the transaction may be distinguished from other transactions in the cluster based on its transaction ID and other transactions' respective transaction IDs. In one embodiment, a transaction ID for a transaction assigned at a site may be a global ID in a data system including a plurality of clusters, one of which is the cluster including the site. Then the transaction may be distinguished from any other transactions in the data system based on its transaction ID and other transactions' respective transaction IDs.

A transaction ID for a transaction assigned at a site may indicate a scheduled execution order for the transaction relative to other transactions. In that case, for any two transactions that have been executed, a site can determine their orders of execution based on their respective transaction IDs.

The transaction identity assigning unit 504 in this example can assign a transaction ID to the request based on an assignment model and send the transaction ID to the coordination site determiner 506. The coordination site determiner 506 in this example may determine a coordination site for the transaction, e.g. based on information about the transaction from the request analyzer 502 and/or transaction ID from the transaction identity assigning unit 504. Data in a distributed data system or a distributed in-memory engine are distributed in different nodes or sites of the system. Different sites in the system may be in a same hierarchy and parallel from a user's point of view. In addition, the request from the user arrives randomly at a site in the system. As such, the transaction request may be directed to processing data on a site coordination site that is different from the site receiving site receiving the request.

The request itself may include information about the coordination site. For example, the request may be about data processing with respect to a particular set of data located at one or more sites. When the data are located at multiple sites, each of them is a coordination site for the request. The transaction ID assigned to the transaction may also include information about the coordination site. Accordingly, the coordination site determiner 506 may determine the coordination site based on the request and/or the transaction ID and send information about the coordination site to the transaction forwarding unit 508 for transaction forwarding.

Before forwarding the transaction to the coordination site, the coordination site determiner 506 may store the transaction into the request queue (RQ) 507, associated with and according to its transaction ID. In one embodiment, the transaction is stored in the request queue 507 until the request queue clearing unit 520 clears it based on a request queue clearance request.

The transaction forwarding unit 508 in this example may forward a transaction to its coordination site for execution. The transaction forwarding unit 508 may retrieve the transaction from the request queue 507 based on its transaction ID that is sent by the coordination site determiner 506. In one example, the transaction forwarding unit 508 may receive the transaction directly from the coordination site determiner 506.

In one embodiment, the site 410 is both a receiving site and a coordination site for a transaction. Then, the transaction forwarding unit 508 may send the transaction to the transaction obtaining controller 510 for execution of the transaction at the site 410. The transaction forwarding unit 508 may also send a copy of the transaction request to another site for replication backup in case of data recovery at the site 410. The site used for request replication of the site 410 may be a random site or a pre-determined site associated with the site 410.

In another embodiment, another site asks the site 410 to resend transaction requests for data recovery at that site. In this case, the transaction forwarding unit 508 may receive a notification from the recovery coordination module 540 to send transactions having transaction IDs larger than a given transaction ID, i.e. the transactions executed later than the given transaction at that site for data recovery.

The transaction obtaining controller 510 in this example obtains transactions for execution at the site 410, e.g. when the site 410 is a coordination site for the transactions. The transaction obtaining controller 510 may receive a transaction from another site that is a receiving site for the transaction. The transaction obtaining controller 510 may obtain a transaction from the transaction forwarding unit 508 when the site 410 is both the receiving site and the coordination site for the transaction.

In one embodiment, the site 410 detects a data failure and needs to recover data. Then, the transaction obtaining controller 510 may obtain transactions from the recovery module 530 to re-execute the transactions that were previously executed at the site 410.

In another embodiment, the site 410 serves as a site to replicate request associated with a transaction for another site that is both the receiving site and the coordination site for the transaction. In this case, the transaction obtaining controller 510 receives a copy of the request from another site that executes the transaction, and saves the copy of the request into the request queue 507.

After the transaction obtaining controller 510 obtains the transactions, it may forward the transactions to the execution order determiner 512. The execution order determiner 512 in this example determines execution order for the transactions. In one example, the execution order determiner 512 determines the execution order based on the transactions' respective transaction IDs. For example, a transaction ID may indicate time of arrival of the associated transaction. The execution order determiner 512 may determine the execution order based on the time of arrival.

In one embodiment, the execution order determiner 512 may retrieve an assignment model and determine the execution order of the transaction based on both the assignment model and the transactions' respective transaction IDs. For example, the assignment model may promote transactions from one user to have higher execution priorities than transactions from another user, regardless of time of arrival. Once the execution order determiner 512 selects the assignment model, the assignment model may be used by all the other sites in the cluster for determining execution order.

After the execution order determiner 512 determines the execution order of the transaction, it may store the transactions into the work queue 513 according to the order. In addition, the execution order determiner 512 may send information about the execution order and the transactions to the execution partition determiner 514.

The execution partition determiner 514 in this example determines an execution partition for each transaction. As discussed above, each site in the cluster may include one or more partitions. Each partition at the site 410 can be affiliated with a CPU core and a portion of the memory at the site 410. The execution partition determiner 514 may retrieve the next transaction in the work queue 513 and determine one or more partitions associated with the next transaction. Then, the execution partition determiner 514 may forward the next transaction to the one or more partition execution engines 516 each of which corresponds to a determined partition.

Each of the partition execution engines 516 in this example corresponds to a partition. The partition execution engine corresponding to a determined partition for a transaction may execute the transaction or part of the transaction for a multiple-partition transaction. After execution of the transaction, data at the partition may be deleted, inserted, and/or updated. That is, each execution of a transaction at the site 410 may change the memory state of the site 410.

After execution of the transactions, the partition execution engines 516 may store log of the committed transactions, e.g. into a commit queue in each of the partition execution engines 516. From time to time, the one or more partition execution engines 516 may persistently store the commit logs, e.g. into a local disk at the site 410 or into the global storage 150.

After execution of each transaction, a partition execution engine may generate and send an execution complete notice to the transaction complete notifying unit 518. The transaction complete notifying unit 518 in this example receives execution complete notices from the different partition execution engines 516. The transaction complete notifying unit 518 may also receive information about determined partition(s) associated with each transaction. As such, the transaction complete notifying unit 518 can determine whether a transaction has been finished by all of the determined partition(s). If so, the transaction complete notifying unit 518 may generate and send a transaction complete notice to the receiving site associated with the transaction.

In one embodiment, the transaction is executed to recover data at the site 410, based on a request generated by the recovery module 530. In this case, the transaction complete notifying unit 518 may send the transaction complete notice to the recovery module 530 to indicate completeness of the transaction.

In another embodiment, the site 410 is both the receiving site and the coordination site for the transaction. In this case, the transaction complete notifying unit 518 may send the transaction complete notice to the request queue clearing unit 520 to indicate completeness of the transaction.

In yet another embodiment, after the completed transactions are persistently stored, the transaction complete notifying unit 518 may send a request queue clearance request carried together with the transaction complete notice to notify the request queue clearing unit 520 at the receiving site to clear the transaction request from the request queue 507 at the receiving site. Because once the request has been committed and persistently stored, there is no need to store an extra copy of the request in the memory, i.e. in the request queue 507.

The request queue clearing unit 520 in this example may receive a request queue clearance request, either from another site that is a receiving site or from the transaction complete notifying unit 518 in the site 410. Based on the request queue clearance request, the request queue clearing unit 520 may determine an associated transaction request and clear the transaction request from the request queue 507 to save memory space.

The snapshot performer 522 in this example can take a snapshot of the memory state of the site 410. The memory state may include state of the request queue 507, the work queue 513, and the commit queues inside each of the partition execution engines 516. The snapshot performer 522 may perform snapshots of the memory state periodically based on the timer 524, or upon request from an administrator of the site 410. The snapshot performer 522 may store the snapshots persistently, e.g. in a local disk at the site 410 or in the global storage 150.

The recovery module 530 in this example can determine whether the site 410 needs a data recovery. A data recovery may be needed when the site 410 is turned off abnormally, fails some data, or loses some data. When a data recovery is needed at the site 410, the site 410 may enter a recovery process.

During the recovery process, the recovery module 530 may restore the latest snapshot, e.g. from a local disk or the global storage 150. Without loss of generality, the transaction ID associated with the latest snapshot is T1. That is, T1 was being executed at the site 410 when the latest snapshot was taken. In addition, the recovery module 530 may read commit logs persistently stored in the local disk or the global storage 150. The commit logs include T1 and transactions following T1 that were executed at the site 410.

The recovery module 530 may request to redo the committed transactions starting from T1 sequentially, according to their previous execution order, with the help from the transaction obtaining controller 510, the execution order determiner 512, the execution partition determiner 514, the one or more partition execution engines 516, and the transaction complete notifying unit 518. Without loss of generality, the last transaction recorded in the commit log has a transaction ID T2. That is, no transaction after T2 was persistently stored.

Then, the recovery module 530 may establish connections with other sites in the cluster and ask the other sites to send the requests buffered in their respective request queues. These transactions should be executed later than T2. For example, the transaction IDs for these transactions are greater than T2, if the transactions were executed according to their transaction IDs. The other sites have the requests buffered in their respective request queues, either because they sent the requests to the site 410 before or because they serve as data replication backups when the site 410 is both the receiving site and the coordination site for a transaction.

The recovery coordination module 540 at the site 410 in this example can coordinate a data recovery at another site. For example, the site 410 is the receiving site for transactions that were executed at another site serving as the coordination site for the transactions. If the coordination site detects a data failure and needs data recovery, the coordination site may ask the site 410 to send requests associated with the transactions again to the coordination site. Then, the recovery coordination module 540 may retrieve the requests buffered in the request queue 507 and send them again to the coordination site for data recovery at the coordination site.

Figure 6:
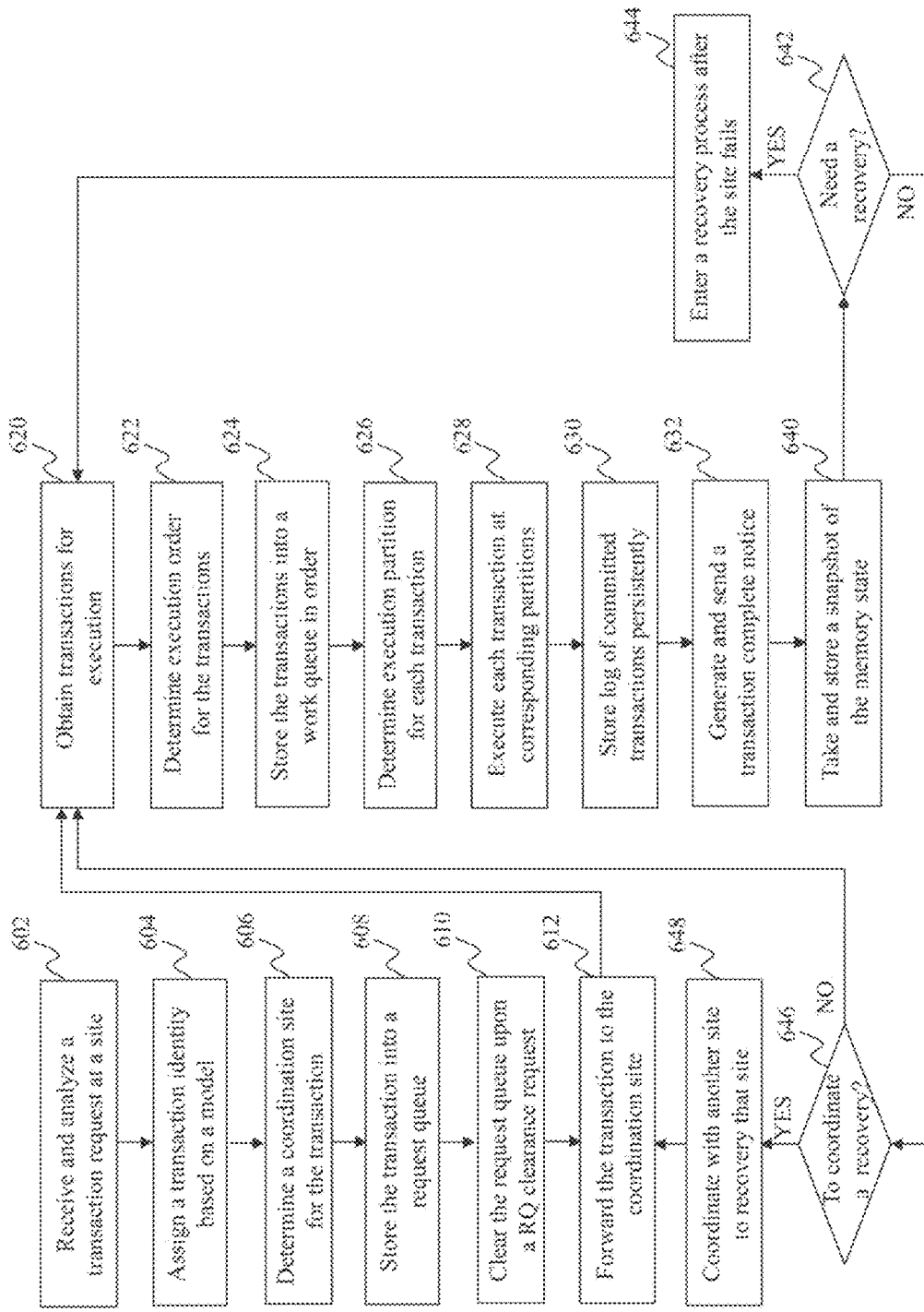
FIG. 6 is a flowchart of an exemplary process performed by a site, according to an embodiment of the present teaching.

FIG. 6 is a flowchart of an exemplary process performed by a site, e.g. the site 410 in FIG. 5, according to an embodiment of the present teaching. At 602, a transaction request is received and analyzed at a site. Accordingly, the site may be referred as the receiving site for the transaction.

At 604, a transaction ID is assigned to the transaction based on a model. At 606, a coordination site is determined for the transaction. At 608, the transaction is stored into a request queue at the receiving site.

At 610, the request queue is cleared upon a request queue clearance request. It can be understood that 610 may be performed any time upon the request queue clearance request, not necessarily after 608 and before 612 as shown in FIG. 6.

At 612, the transaction is forwarded to the coordination site. In one example, the coordination site is the same as the receiving site for the transaction. The process may then either go back to 602 to receive another transaction or go to 620 as shown in FIG. 6.

At 620, transactions are obtained at the site for execution. At 622, execution order is determined for the transactions. At 624, the transactions are stored into a work queue in order, e.g. according to their respective transaction IDs. At 626, execution partition is determined for each transaction. At 628, each transaction is executed at corresponding partition(s). At 630, log of committed transactions is stored persistently. At 632, a transaction complete notice is generated and sent for each completed transaction.

At 640, a snapshot of the memory state is taken and stored, e.g. in a persistent storage. The snapshot may be taken periodically, e.g. every day or every week. Accordingly, it can be understood that 640 may be performed upon a pre-determined schedule, not necessarily after 632 and before 642 as shown in FIG. 6.

At 642, it is determined that whether the site needs a data recovery. If so, the process goes to 644, where a recovery process is entered after e.g. some data failure at the site; and the process goes back to 620 after full data recovery. Otherwise, the process goes to 646 to determine whether to coordinate a data recovery at another site. If so, the process goes to 648, where the site coordinates with another site to recovery that site; and the process goes back to 612 to send transactions to that site for data recovery. Otherwise, the process goes back to 620 to obtain more transaction for execution.

Figure 7:
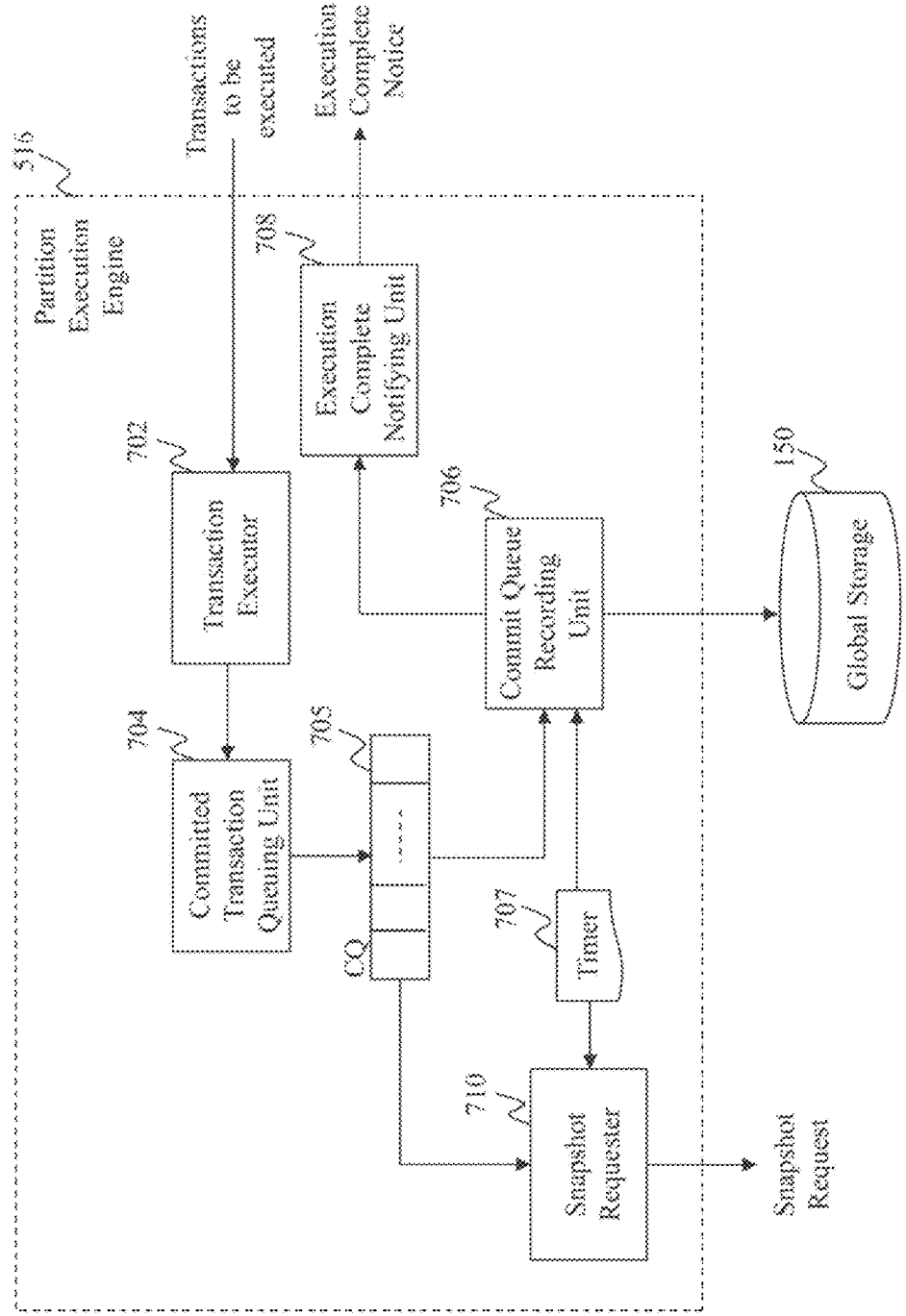
FIG. 7 illustrates an exemplary diagram of a partition execution engine, according to an embodiment of the present teaching.

FIG. 7 illustrates an exemplary diagram of a partition execution engine, according to an embodiment of the present teaching. The partition execution engine may be one of the partition execution engines 516 in FIG. 5. As shown in FIG. 7, the partition execution engine in this example includes a transaction executor 702, a committed transaction queueing unit 704, a commit queue (CQ) 705, a commit queue recording unit 706, a timer 707, an execution complete notifying unit 708, and a snapshot requester 710.

The partition execution engine may correspond to a partition at the site 410. The transaction executor 702 in this example receives transactions to be executed at the partition. As discussed before, the transactions can be ordered according to their respective transaction IDs. Accordingly, the transaction executor 702 may execute the transactions one by one according to their transaction IDs.

The committed transaction queueing unit 704 in this example stores each committed transaction from the transaction executor 702 into the commit queue 705. The committed transaction queueing unit 704 may also save the committed transactions according to their respective transaction IDs. Thus, the commit queue 705 may include commit logs about committed transactions at the partition.

The commit queue recording unit 706 in this example can persistently store the commit logs at the commit queue 705, e.g. into a local disk or into the global storage 150. The commit queue recording unit 706 can perform the persistent storing periodically based on the timer 707. For example, the commit queue recording unit 706 can persistently store the commit logs every hour or every minute.

The execution complete notifying unit 708 in this example can generate and send an execution complete notice to indicate that execution of the transaction at the partition is complete. When this is a single-partition transaction, the site 410 may send a request queue clearance request to ask the receiving site to clear the request from the request queue because the transaction has been executed and persistently stored. When this is a multiple-partition transaction, the site 410 will wait for the transaction to be completed at the multiple partitions including the partition here and then send a request queue clearance request to ask the receiving site to clear the request from the request queue.

The snapshot requester 710 in this example may determine whether it is time to perform a snapshot of the memory state of the partition. In one embodiment, the snapshot requester 710 may determine that a snapshot of the memory state of the partition is taken every day or every week, based on time information provided by the timer 707. In another embodiment, the snapshot requester 710 may determine that a snapshot of the memory state of the partition should be taken, e.g. after a pre-determined number of transactions are executed. The snapshot requester 710 may send a snapshot request to the snapshot performer 522 to perform a snapshot, once the snapshot requester 710 determines that it is time to take a snapshot. In one example, when the snapshot performer 522 takes a snapshot, it covers memory state of the entire site.

Figure 8:
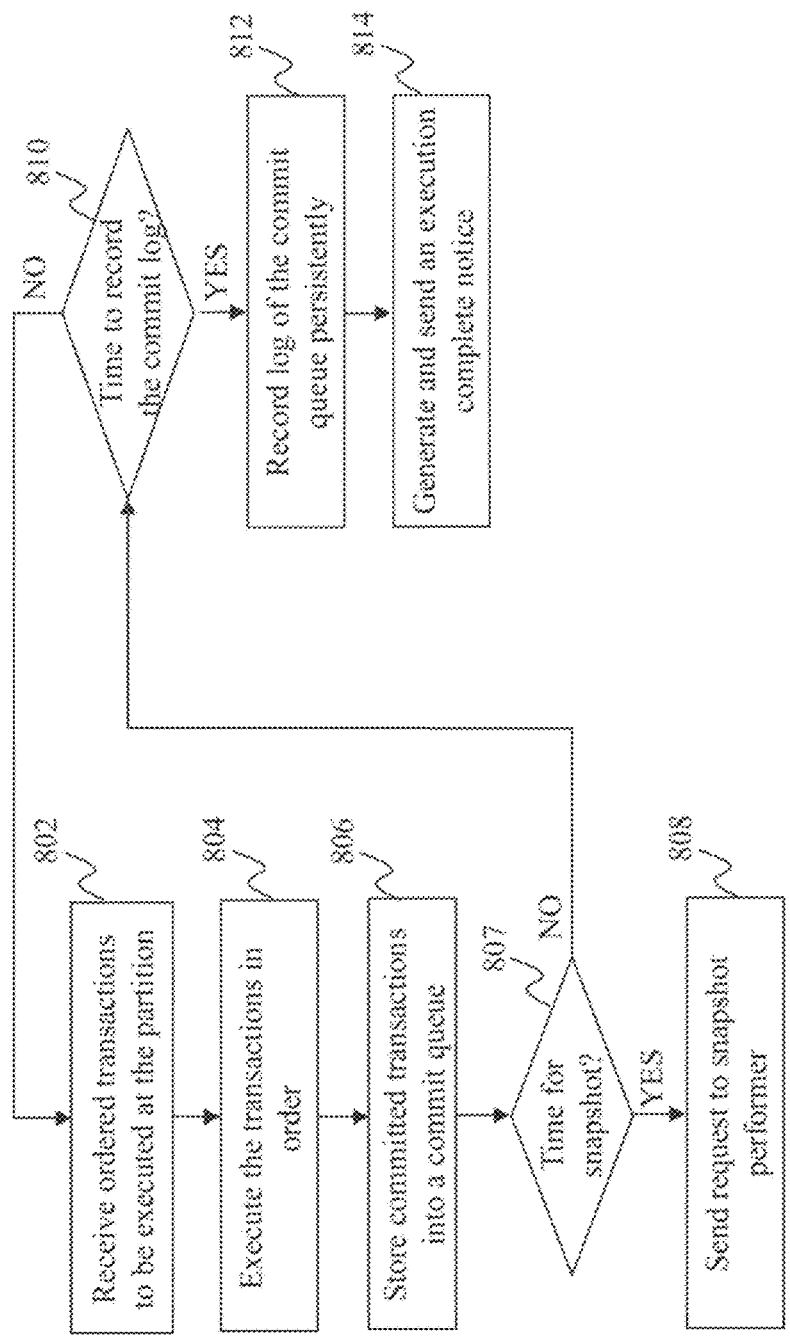
FIG. 8 is a flowchart of an exemplary process performed by a partition execution engine, according to an embodiment of the present teaching.

FIG. 8 is a flowchart of an exemplary process performed by a partition execution engine, e.g. the partition execution engine 516 in FIG. 7 corresponding to a partition, according to an embodiment of the present teaching. At 802, ordered transactions to be executed are received at the partition. At 804, the transactions are executed in order. At 806, committed transactions are stored into a commit queue.

At 807, it is determined whether it is time for a snapshot. If so, the process goes to 808, where a request is sent to the snapshot performer for performing a snapshot. Otherwise, the process goes to 810 to determine whether it is time to record the commit logs. If so, the process goes to 812 to record log of the commit queue persistently; and the process then goes to 814 to generate and send an execution complete notice to indicate that the transaction is completed at the partition. Otherwise, the process goes back to 802 to receive more transactions for execution.

Figure 9:
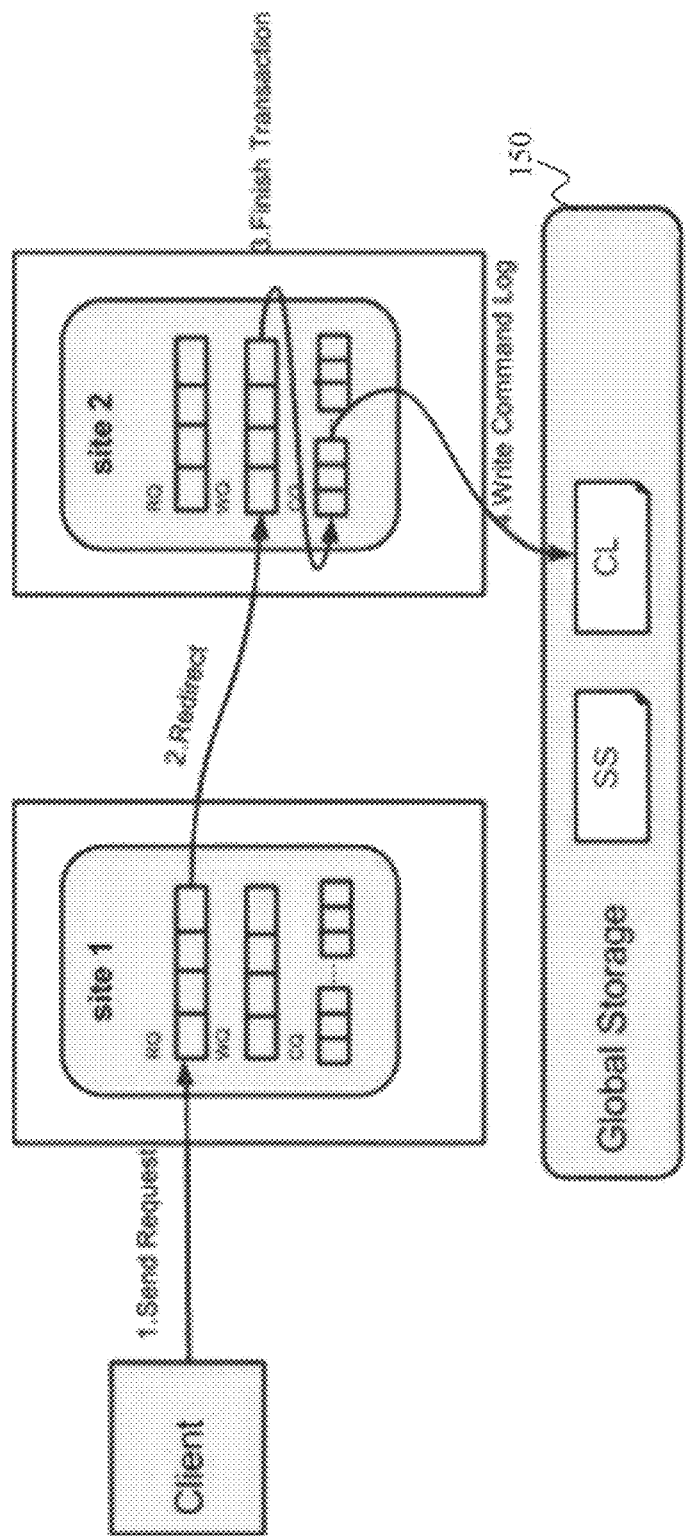
FIG. 9 illustrates an exemplary process for executing a transaction, according to an embodiment of the present teaching.

FIG. 9 illustrates an exemplary process for executing a transaction, according to an embodiment of the present teaching. At step 1 of this example, a client, which may be an individual user or a corporate user, sends a request to site 1, which is the receiving site for the request. Site 1 may save a copy of the request into its request queue and redirects at step 2 the request to site 2, which is the coordination site for the request. Site 2 can save the request into its work queue and execute the transaction according to a time schedule. After site 2 finishes the transaction at step 3, site 2 may save the finished or committed transaction into its Commit Queue (CQ). At step 4, site 2 may store data of its commit queue into a commit log (CL) in the global storage 150. In one embodiment, site 2 may store its commit queue data into a CL at a local disk inside site 2. In another embodiment, after site 2 saves the transaction into CL, it can notify site 1 to delete the copy of the request from the request queue in site 1, because information about the request has been persistently stored in a global storage or a local disk. This illustrates how a transaction typically traverses through the system.

In general, each PE at a site can execute its transactions in their global order according to their respective global IDs. There are different ways to assign the transaction ID, e.g. through a global sequencer. If a transaction is committed, it may be added to the PE's commit queue. An additional thread may periodically persistent commit queue onto a persistent file system, which can be a local disk or a reliable global storage such as HDFS. Once the log for a committed transaction is persisted, the site 410 can notify its receiving site to clear it from its request queue. Network messages can be saved by piggybacking the notifications on other messages this site sends to the receiving site. Once a receiving site receives such notifications, the transaction in its request queue can be cleared to save memory usage.

Each site periodically persist snapshots of its memory state on certain file systems such as local disks or a reliable global storage, e.g. HDFS. Snapshots may be executed as read-only transactions, which will also have globally unique transaction IDs and can be done asynchronously by another thread. Thus, snapshot may not block other requests. During normal operations such as scheduled maintenance or system upgrade, the cluster can be turned down and then up, using the persisted snapshots and commit logs.

Figure 10:
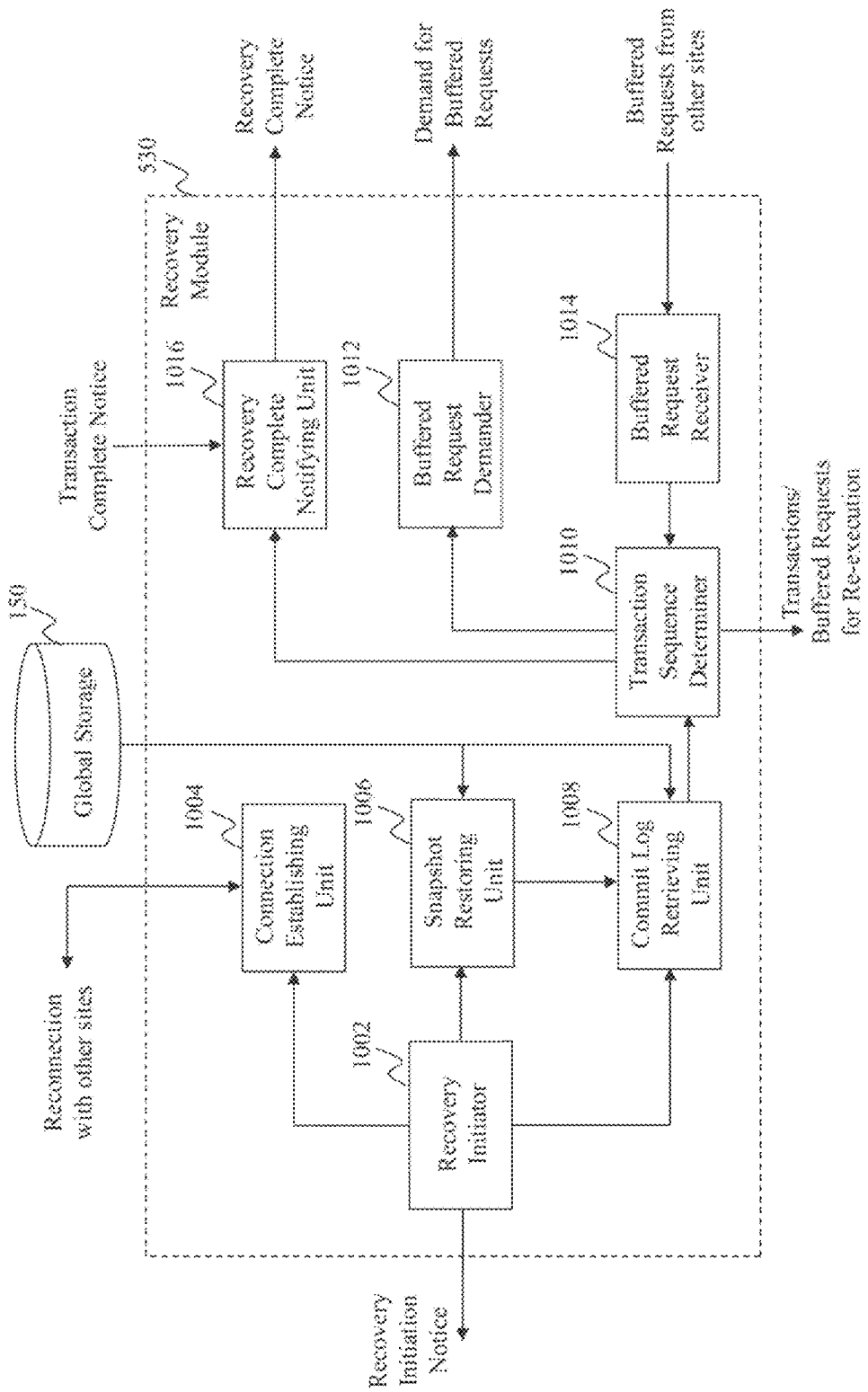
FIG. 10 illustrates an exemplary diagram of a recovery module, according to an embodiment of the present teaching.

FIG. 10 illustrates an exemplary diagram of a recovery module 530, e.g. the recovery module 530 in the site 410 in FIG. 5, according to an embodiment of the present teaching. The recovery module 530 in this example includes a recovery initiator 1002, a connection establishing unit 1004, a snapshot restoring unit 1006, a commit log retrieving unit 1008, a transaction sequence determiner 1010, a buffered request demander 1012, a buffered request receiver 1014, and a recovery complete notifying unit 1016.

The recovery initiator 1002 in this example may determine that a data recovery is needed at the site. For example, a site may fail or lose data due to a power outage, a network connection outage, a hardware stuck, an application dead loop, etc. In any of these cases, data recovery is needed at the site. The recovery initiator 1002 may initiate a data recovery process after detecting a data failure or loss at the site. The recovery initiator 1002 can generate a recovery initiation notice and send it to the connection establishing unit 1004, the snapshot restoring unit 1006, the commit log retrieving unit 1008, and other sites in the cluster.

The connection establishing unit 1004 in this example may establish connection with other sites, after receiving the recovery initiation notice from the recovery initiator 1002. In one embodiment, the connection was not broken during data failure. Then, the connection establishing unit 1004 may confirm the connection is still good with the other sites in the cluster.

The snapshot restoring unit 1006 in this example restores a latest snapshot from a persistent storage, after receiving the recovery initiation notice from the recovery initiator 1002. The persistent storage may be a local disk on the site 410 or the global storage 150. The latest snapshot was the snapshot last taken before the data failure at the site 410 and included memory state of the site 410 at the time the snapshot was taken. By restoring the latest snapshot, the site 410 can have a memory state same as that when the snapshot was taken. The snapshot restoring unit 1006 may also determine a transaction that was executed or to be executed when the last snapshot was taken. Without loss of generality, the transaction has a transaction ID T1. The snapshot restoring unit 1006 may send the transaction ID to the commit log retrieving unit 1008.

The commit log retrieving unit 1008 in this example may retrieve commit logs from a persistent storage, after receiving the recovery initiation notice from the recovery initiator 1002 and the transaction ID T1 from the snapshot restoring unit 1006. The persistent storage may be a local disk on the site 410 or the global storage 150. In one embodiment, the commit log retrieving unit 1008 retrieves commit logs related to T1 and transactions executed after T1 at the site. The site 410 may re-execute the retrieved transactions to recover data in the memory of the site. Since restoring the latest snapshot already made the site's memory state back to the time when T1 was executed, only T1 and transactions afterwards need to be re-executed.

The transaction sequence determiner 1010 in this example can determine re-execution order for the retrieved transactions. In one embodiment, the retrieved transactions were executed before based on their respective transaction IDs. Then, the transaction sequence determiner 1010 can determine re-execution order for the retrieved transactions based on their respective transaction IDs, such that the re-execution order is the same as the original execution order for the transactions. The transaction sequence determiner 1010 may send the ordered transactions to the transaction obtaining controller 510 for re-execution, with the help from the execution order determiner 512, the execution partition determiner 514, the one or more partition execution engines 516, and the transaction complete notifying unit 518, as discussed above regarding FIG. 5.

The transaction sequence determiner 1010 may determine a last transaction re-executed based on the retrieved commit logs. Without loss of generality, the last transaction has a transaction ID T2. It can be understood based on the above discussion that, T2 was executed after T1 before the data failure at the site. The transaction sequence determiner 1010 may send the transaction ID T2 to the buffered request demander 1012.

The buffered request demander 1012 in this example may send demand to other sites in the cluster to ask for buffered requests in the other sites, where the site 410 was the coordination site that executed the buffered requests before the data failure at the site 410. In one embodiment, the buffered request demander 1012 only asks for buffered requests associated with transactions executed later than T2 at the site 410 before the data failure. The execution order for a transaction may be determined based on its transaction ID, such that any site can determine whether a transaction was executed after T2 or not, based on the transaction's transaction ID.

The buffered request receiver 1014 in this example may receive the buffered requests from other sites in the cluster. The buffered request receiver 1014 can send the buffered requests to the transaction sequence determiner 1010 that will determine re-execution order of the buffered requests and send the buffered requests in order for re-execution. In one example, the re-execution order of the buffered requests is the same as the original execution order of the buffered requests before the data failure.

The recovery complete notifying unit 1016 in this example may receive transaction complete notices from the transaction complete notifying unit 518 to determine completed transactions that have been re-executed and determine their respective execution times. The recovery complete notifying unit 1016 can receive information about the demanded transactions from the transaction sequence determiner 1010, and compare the demanded transactions with the completed transactions. If the recovery complete notifying unit 1016 determines that all demanded transactions have been re-executed completely in the same order as their original execution order before the data failure, the recovery complete notifying unit 1016 may generate and send a recovery complete notice to the other sites in the cluster. With the recovery initiation notice and the recovery complete notice, the recovery module 530 may notify other sites in the cluster whether the site 410 is in a data recovery process. In one example, other sites in the cluster may hold new transactions for the site 410 during the data recovery process.

In one embodiment, there was no transaction executed after T2 at the site 410 before the data failure. Then, the buffered request receiver 1014 does not receive any requests from the other sites. In this case, the recovery is complete after the retrieved transactions from the commit logs are re-executed.

In another embodiment, the last snapshot was taken shortly before the data failure at the site 410, such that there was no commit log about any transaction executed after T1. In this case, after T1 is re-executed, the buffered request demander 1012 may ask the other sites for buffered requests associated with transactions executed later than T1 at the site 410 before the data failure, for re-execution of the buffered requests for data recovery.

Figure 11:
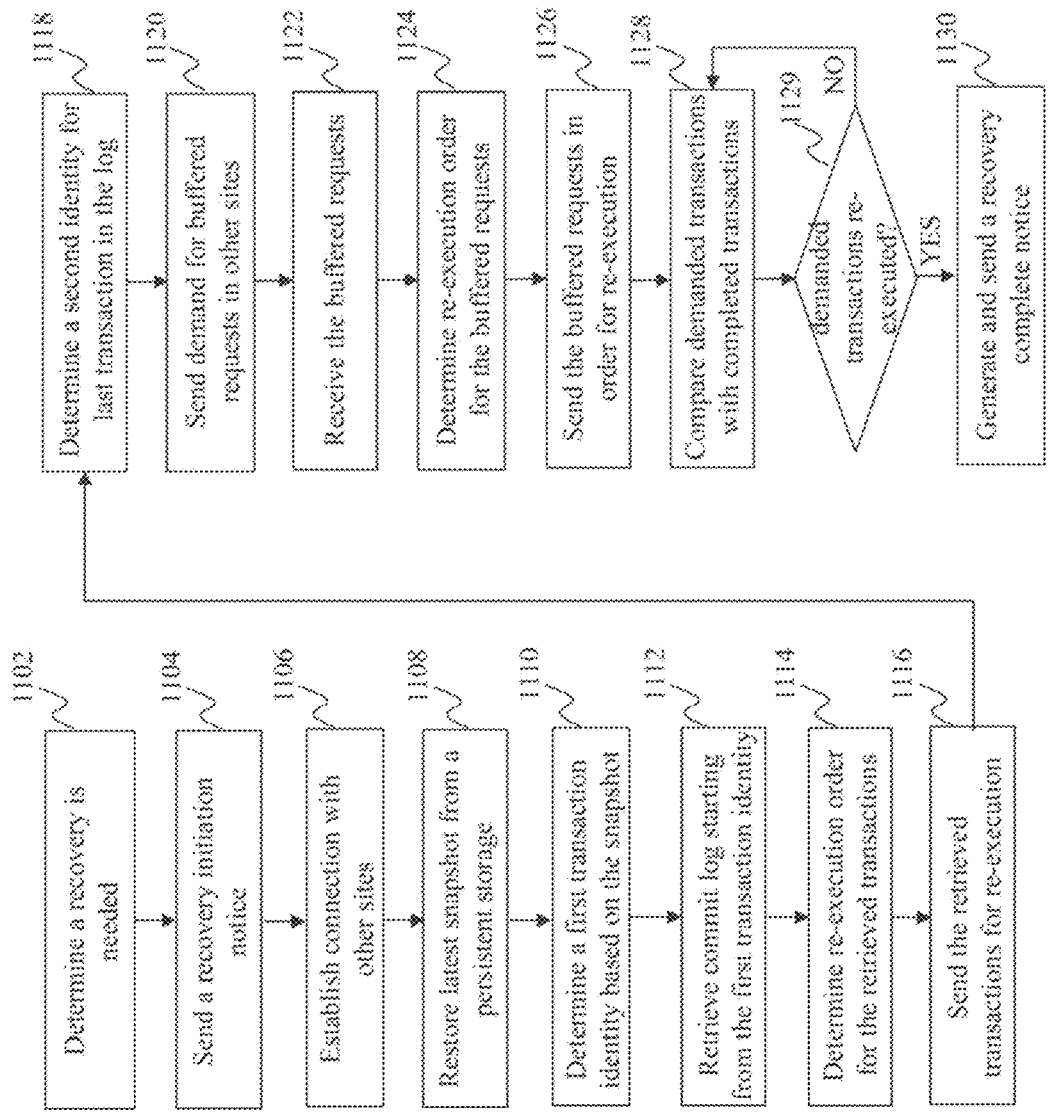
FIG. 11 is a flowchart of an exemplary process performed by a recovery module, according to an embodiment of the present teaching.

FIG. 11 is a flowchart of an exemplary process performed by a recovery module, e.g. the recovery module 530 in FIG. 10, according to an embodiment of the present teaching. At 1102, it is determined that a recovery is needed, e.g. due to a data failure or loss at the site 410. At 1104, a recovery initiation notice is sent, e.g. to the other sites in the cluster. At 1106, connection with other sites is established. At 1108, the latest snapshot is restored from a persistent storage. At 1110, a first transaction ID is determined based on the snapshot, e.g. the transaction ID related to a transaction that was executed when the latest snapshot was taken. At 1112, commit logs are retrieved starting from the first transaction ID. At 1114, re-execution order is determined for the retrieved transactions. At 1116, the retrieved transactions are sent for re-execution based on the re-execution order.

At 1118, a second transaction ID is determined for the last transaction in the retrieved commit logs. At 1120, demand is sent to other sites to ask for buffered requests in the other sites. In one embodiment, demanded requests include requests associated with transactions executed later than the second transaction ID at the site 410 before the data failure. At 1122, the buffered requests are received. At 1124, re-execution order is determined for the buffered requests. At 1126, the buffered requests are sent for re-execution, according to the re-execution order.

At 1128, demanded transactions are compared with completed transactions that are re-executed. At 1129, it is determined that whether all of the demanded transactions are re-executed. If so, the process goes to 1130, where a recovery complete notice is generated and sent, e.g. to the other sites in the cluster. Otherwise, the process goes back to 1128 to wait for more completed transactions and compare the demanded transactions with the completed transactions again.

It can be understood that the steps in the flowchart may be performed in a different order than that shown in FIG. 11. For example, 1106 may be performed after 1108 and before 1120.

Figure 12:
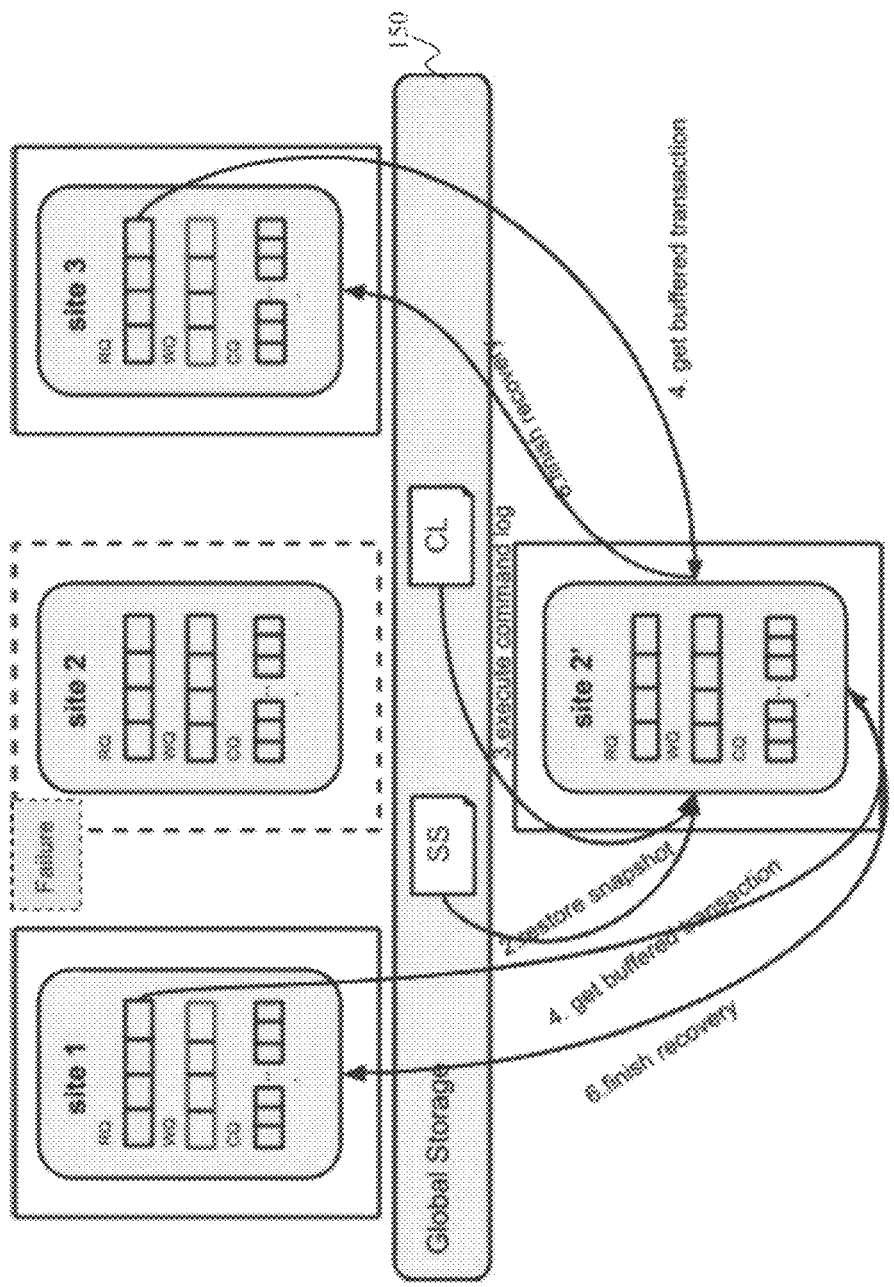
FIG. 12 illustrates an exemplary process for recovering data at a failure site, according to an embodiment of the present teaching.

FIG. 12 illustrates an exemplary process for recovering data at a failure site, according to an embodiment of the present teaching. As illustrated in FIG. 12, site 2 detects data failure. In one case, if site 2 cannot even restart, an additional backup site can take over control and enter the recover process. To support this case, snapshots and commit logs should be persisted on a reliable global file system that the backup site can access.

In the example shown in FIG. 12, the failed or replacing site, referred as the joining site (JS), performs the following steps:

1. JS establishes connections with other sites. This can be done concurrently with the following steps.

2. JS may restore the latest snapshot, e.g. from the global storage 150. Without loss of generality, the transaction ID associated with the latest snapshot is T1.

3. JS may read its commit log, starting from T1 and redo the committed transactions sequentially. Without loss of generality, the last transaction recorded in the commit log has a transaction ID T2.

4. JS can ask all other sites in the cluster to send the requests buffered in their respective request queues. The transaction IDs of these transactions should be greater than T2.

5. JS can execute these transactions one-by-one, strictly in the increasing order of their transaction IDs, same as the order according to which the transactions were previously executed.

In one embodiment, if JS receives a transaction Tx from a receiving site before JS requests to resend, JS will notify the receiving site that its recovery has been finished when all transactions whose ID is smaller than Tx are executed.

In another embodiment, multiple sites in the cluster may fail at the same time. To support k-site failure recovery, where k is greater than 1, each receiving site will explicitly replicate the requests it receives to additional k−1 sites. Upon recovery, each failed site will follow a similar procedure as described above. The difference is that a JS may have to de-duplicate the transactions it receives from other sites, when multiple copies of a request are received from different sites. While a JS is recovering, if a running transaction needs to touch the partitions at JS, the transaction may be restarted and blocked until recovery finishes. Otherwise, the transaction will be executed as normal. Any client trying to connect to the recovering JS can be blocked until recovery finishes. Given the speed of in-memory systems, the recovering process may last around tens of seconds, if not shorter. Therefore the system will return to full functioning very quickly.

In yet another embodiment, only a partition at the site 410 has a data failure. Then, the data recovery may be performed only with respect to the partition.

Figure 13:
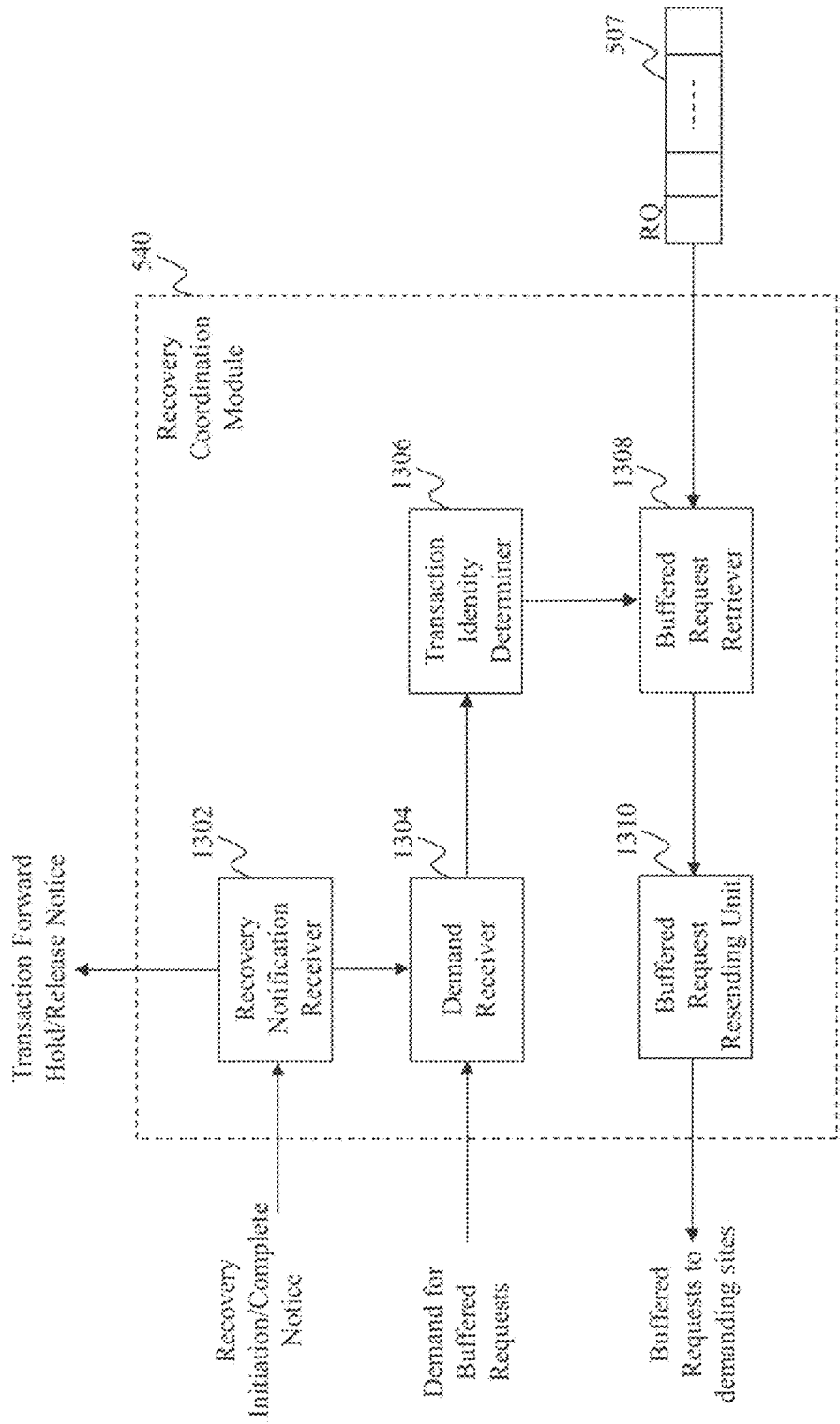
FIG. 13 illustrates an exemplary diagram of a recovery coordination module, according to an embodiment of the present teaching.

FIG. 13 illustrates an exemplary diagram of a recovery coordination module 540, according to an embodiment of the present teaching. The recovery coordination module 540 in this example includes a recovery notification receiver 1302, a demand receiver 1304, a transaction identity determiner 1306, a buffered request retriever 1308, and a buffered request resending unit 1310. The recovery coordination module 540 may work when the site 410 helps another site (joining site) to recover data at the joining site.

The recovery notification receiver 1302 in this example receives a recovery initiation notice from a joining site. In one embodiment, the recovery notification receiver 1302 can send to the transaction forwarding unit 508 a transaction forward hold notice for the joining site, such that the transaction forwarding unit 508 can suspend forwarding requests to the joining site even if the joining site is the coordination site executing the requests. The recovery notification receiver 1302 may notify the demand receiver 1304 to monitor demand from the joining site.

After the joining site finishes its data recovery, the recovery notification receiver 1302 may receive a recovery complete notice from the joining site. Accordingly, the recovery notification receiver 1302 may send to the transaction forwarding unit 508 a transaction forward release notice for the joining site, such that the transaction forwarding unit 508 can continue forwarding requests to the joining site when the joining site is the coordination site executing the requests.

The demand receiver 1304 in this example receives demand for buffered requests in the request queue 507, e.g. from the joining site. The transaction identity determiner 1306 in this example determines transaction IDs related to the demand. As discussed above, when the joining site recovers data, it may restore a latest snapshot and retrieve commit logs from a persistent storage. The joining site may re-execute the retrieved transactions among which the last transaction has a transaction ID, e.g. T2. Then, the demand to the site 410 is for buffered requests about transactions executed after T2 at the joining site before its data failure. In one embodiment, the transaction identity determiner 1306 can determine transactions executed after T2, based on their respective transaction IDs.

The buffered request retriever 1308 in this example receives the determined transaction IDs from the transaction identity determiner 1306 and retrieves the demanded requests from the request queue 507 based on the determined transaction IDs. The buffered request resending unit 1310 in this example obtains the retrieved requests from the buffered request retriever 1308 and resends the retrieved requests to the joining site.

Figure 14:
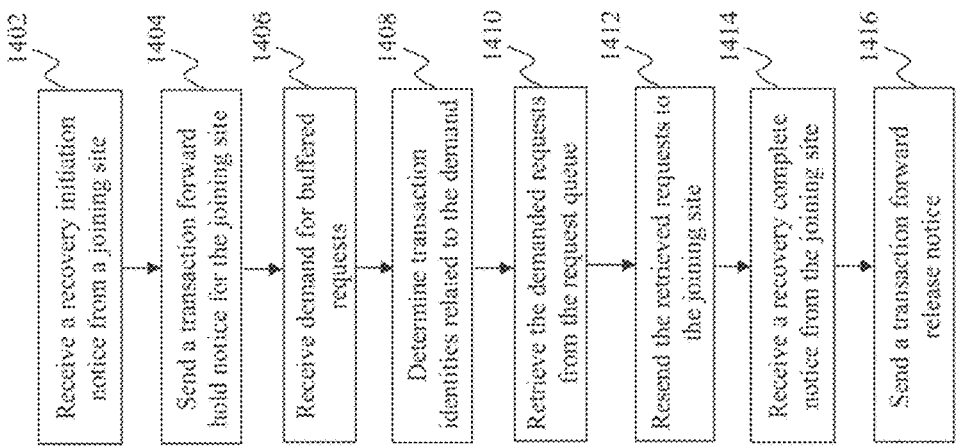
FIG. 14 is a flowchart of an exemplary process performed by a recovery coordination module, according to an embodiment of the present teaching.

FIG. 14 is a flowchart of an exemplary process performed by a recovery coordination module, e.g. the recovery coordination module 540 in FIG. 13, according to an embodiment of the present teaching. At 1402, a recovery initiation notice is received from a joining site. At 1404, a transaction forward hold notice is sent for the joining site. At 1406, demand is received for buffered requests in the request queue 507, e.g. regarding transactions executed after a certain transaction. At 1408, transaction identities are determined based on the demand, e.g. regarding the transactions executed after the certain transaction. At 1410, the demanded requests are retrieved from the request queue 507. At 1412, the retrieved requests are resent to the joining site. At 1414, a recovery complete notice is received from the joining site. At 1416, a transaction forward release notice is sent for the joining site.

Figure 15:
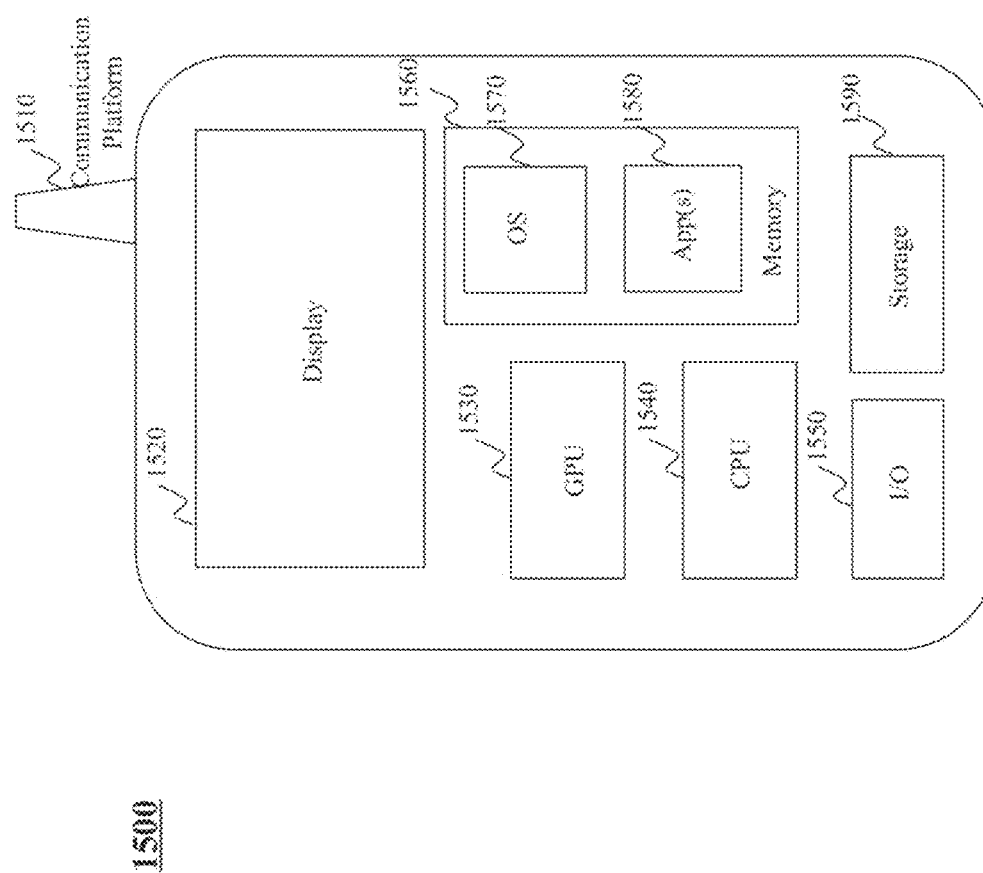
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device used by the user to communicate with the data clusters 140 is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for transmitting transaction requests and receiving transaction complete notices on the mobile device 1500. User interactions with content related to data processing may be achieved via the I/O devices 1550 and provided to the data clusters 140, e.g., via the network 120.

To implement various modules, units, and their functionalities described in the present disclosure, computer hardware platforms may be used as the hardware platform(s) for one or more of the elements described herein (e.g., the site 410 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies to recover data as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the data recovery techniques, as described herein. For example, the site 410 may be implemented on a computer such as computer 1600, via its hardware, software program, firmware, or a combination thereof. Although only one such computer is shown, for convenience, the computer functions relating to data recovery as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of data recovery, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a node or other big data server into the hardware platform(s) of a computing environment or other system implementing a computing environment or similar functionalities in connection with data recovery. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the data recovery as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for managing a request in a data system comprising a plurality of nodes and global storage, the method comprising:
   receiving, by a first node in the data system, a request for a transaction of data;
   determining a second node in the data system based on the request, wherein the second node is to carry out the transaction;
   storing the request into a first request queue at the first node;
   sending the request to the second node;
   obtaining, by the first node, a notice from the second node indicating that information associated with the transaction has been persistently stored by the second node or the global storage; and
   removing the request from the first request queue in response to the notice being obtained.

2. The method of claim 1, further comprising:
   executing the transaction based on the request; and
   storing the transaction persistently, wherein the second node stores the request into a second request queue at the second node and removes the request from the second request queue in response to the notice being sent to the first node.

3. The method of claim 1, wherein the second node:
   executes the transaction based on the request;
   stores the transaction persistently; and
   sends the notice to the first node after the transaction has been persistently stored.

4. The method of claim 1, further comprising:
   performing a snapshot of a memory state of the first node; and
   storing the snapshot persistently.

5. The method of claim 1, further comprising:
   assigning an identity to the transaction, wherein the identity distinguishes the transaction from other transactions in the data system and indicates an order for an execution of the transaction relative to executions of other transactions.

6. The method of claim 1, further comprising:
   sending the request to a third node in the data system.

7. The method of claim 1, further comprising:
   receiving, by the first node, an additional request for an additional transaction of data;
   determining that the first node is to carry out the additional transaction based on the additional request;
   storing the additional request into the first request queue;
   sending the additional request to at least one of the second node and a third node in the data system;
   executing the additional transaction;
   storing the additional transaction persistently by one of local disk of the first node and the global storage; and
   sending an additional notice to the at least one of the second node and the third node indicating that the additional transaction has been stored persistently.

8. The method of claim 1, wherein subsequent to the request being removed from the first request queue, the second node configurable to recover the transaction from one of a commit log locally stored by the second node or from the global storage.

9. The method of claim 4, wherein the snapshot is stored by the global storage, the first node is configured to recover the memory state subsequent to the request being removed from the first request queue, by:
   restoring the snapshot of the memory state from the global storage; and
   loading commit logs stored in the global storage that occurred after the snapshot of the memory state; and
   sending forwarding requests to the plurality of other nodes to obtain a copy of requests that occurred subsequent to the commit logs being stored in the global storage.

10. A system having at least one processor, storage, and a communication platform connected to a network for managing a request in a data system comprising a plurality of nodes and global storage, the system comprising:
   a request analyzer located in a first node in the data system and configured for receiving a request for a transaction of data;
   a coordinate site determiner located in the first node and configured for determining a second node in the data system based on the request and storing the request into a first request queue at the first node, wherein the second node is to carry out the transaction;
   a transaction forwarding unit located in the first node and configured for sending the request to the second node;
   a transaction obtaining controller located in the first node and configured for obtaining a notice from the second node indicating that information associated with the transaction has been persistently stored by the second node or the global storage; and
   a request queue clearing unit located in the first node and configured for removing the request from the first request queue in response to the notice being sent.

11. The system of claim 10, wherein the second node:
   executes the transaction based on the request;
   stores the transaction persistently; and
   sends the notice to the first node after the transaction has been persistently stored.

12. The system of claim 10, further comprising at least one of:
   a snapshot performer configured for performing a snapshot of a memory state of the first node and storing the snapshot persistently; and
   a transaction identity assigning unit configured for assigning an identity to the transaction, wherein the identity distinguishes the transaction from other transactions in the data system and indicates an order for an execution of the transaction relative to executions of other transactions.

13. A machine-readable, non-transitory and tangible medium having first information recorded thereon for managing a request in a data system comprising a plurality of nodes and global storage, wherein the first information, when read by the machine, causes the machine to perform the following:
   receiving, by a first node in the data system, a request for a transaction of data;
   determining a second node in the data system based on the request, wherein the second node is to carry out the transaction;
   storing the request into a first request queue at the first node;
   sending the request to the second node;
   obtaining, by the first node, a notice from the second node indicating that information associated with the transaction has been persistently stored by the second node or the global storage; and
   removing the request from the first request queue in response to the notice being sent.

14. The machine-readable, non-transitory and tangible medium of claim 13, wherein the first information, when read by the machine, further causes the machine to perform the following:
   executing the transaction based on the request; and
   storing the transaction persistently, wherein the second node stores the request into a second request queue at the second node and removes the request from the second request queue in response to the notice being sent to the first node.

15. The machine-readable, non-transitory and tangible medium of claim 13, wherein the second node:
   executes the transaction based on the request;
   stores the transaction persistently; and
   sends the notice to the first node after the transaction has been persistently stored.

16. The machine-readable, non-transitory and tangible medium of claim 13, wherein the first information, when read by the machine, further causes the machine to perform the following:
   performing a snapshot of a memory state of the first node; and
   storing the snapshot persistently.

17. The machine-readable, non-transitory and tangible medium of claim 13, wherein the first information, when read by the machine, further causes the machine to perform the following:
   assigning an identity to the transaction, wherein the identity distinguishes the transaction from other transactions in the data system and indicates an order for an execution of the transaction relative to executions of other transactions.

* * * * *